United States Patent [19]

Wills et al.

[11] Patent Number: 5,136,216
[45] Date of Patent: Aug. 4, 1992

[54] AC MOTOR DRIVE SYSTEM

[75] Inventors: Frank E. Wills, York; Harold R. Schnetzka, II, Spring Grove; Roy D. Hoffer, Lancaster, all of Pa.

[73] Assignee: York International Corporation, York, Pa.

[21] Appl. No.: 655,840

[22] Filed: Feb. 15, 1991

[51] Int. Cl.⁵ .................................. H02P 07/36
[52] U.S. Cl. .......................... 318/123; 318/747; 318/727; 323/220
[58] Field of Search ............ 318/783, 786, 785, 685, 318/795, 122, 123, 124, 161, 747–749, 781, 727; 323/220, 227

[56] References Cited

U.S. PATENT DOCUMENTS

| | | | |
|---|---|---|---|
| 3,585,475 | 6/1971 | Ban | 318/162 |
| 3,753,062 | 8/1973 | Greenwell | 318/227 |
| 3,764,887 | 10/1973 | Bingley | 321/45 R |
| 3,767,996 | 10/1973 | Bates | 321/9 A |
| 3,913,000 | 10/1975 | Cardwell, Jr. | 321/2 |
| 3,932,836 | 1/1976 | Harrell et al. | 318/171 |
| 4,060,754 | 11/1977 | Kirtley, Jr. et al. | 318/227 |
| 4,100,444 | 7/1978 | Boyd, Jr. | 310/200 |
| 4,211,930 | 7/1980 | Fengler | 318/685 |
| 4,272,714 | 6/1981 | Vind | 318/783 |
| 4,401,933 | 8/1983 | Davy et al. | 318/786 |
| 4,459,535 | 7/1984 | Schutten et al. | 318/807 |
| 4,470,001 | 9/1984 | Resch et al. | 318/778 |
| 4,520,303 | 5/1985 | Ward | 318/786 |
| 4,563,624 | 1/1986 | Yu . | |
| 4,590,413 | 5/1986 | Gritter et al. | 318/803 |
| 4,651,079 | 3/1987 | Wills | 318/811 |
| 4,706,180 | 11/1987 | Wills | 363/98 |
| 4,734,601 | 3/1988 | Lewus | 318/795 |
| 4,788,485 | 11/1988 | Kawagishi et al. | 318/807 |
| 4,808,868 | 2/1989 | Roberts | 318/817 |
| 4,847,745 | 7/1989 | Shekhawat et al. | 363/132 |
| 4,849,871 | 7/1989 | Wallingford | 363/91 |
| 4,996,637 | 2/1991 | Piechnick | 363/16 |

FOREIGN PATENT DOCUMENTS 1464454  2/1977  United Kingdom .

OTHER PUBLICATIONS

"Theory and Design of Small Induction Motors" by C. Veinott, McGraw-Hill, 1959, Chapters 3, 4 and 25.

Primary Examiner—William M. Shoop, Jr.
Assistant Examiner—John W. Cabeca
Attorney, Agent, or Firm—Finnegan, Henderson, Farabow, Garrett & Dunner

[57] ABSTRACT

A motor drive system for driving a conventional single phase PSC motor from a two-phase power source. In one embodiment, the PSC motor is supplied from a three-phase inverter that is controlled to generate two-phase power. In another embodiment, the PSC motor is connectable through a double-pole double-throw switch to either a single phase source including a run capacitor or a two-phase inverter source.

34 Claims, 10 Drawing Sheets

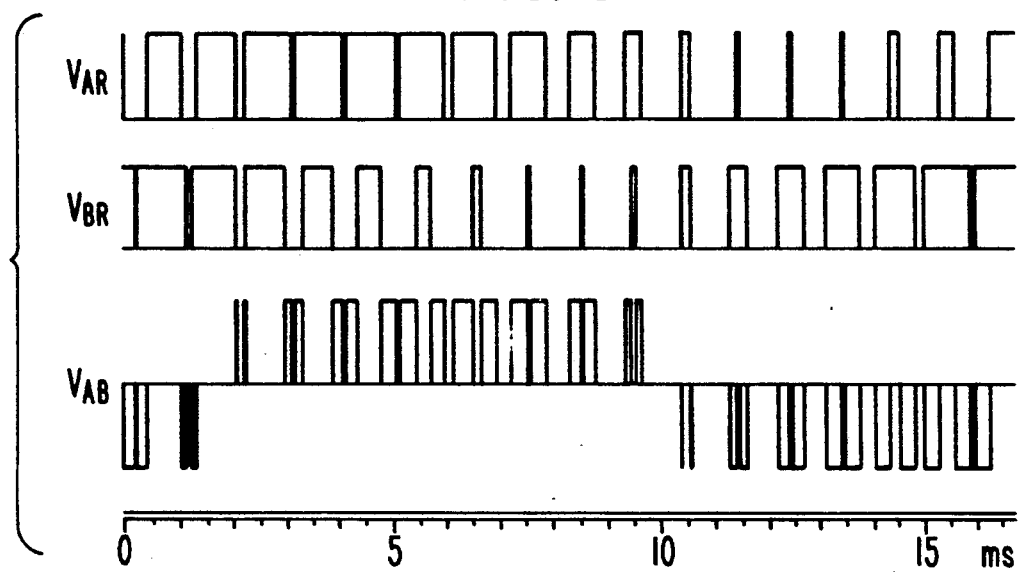
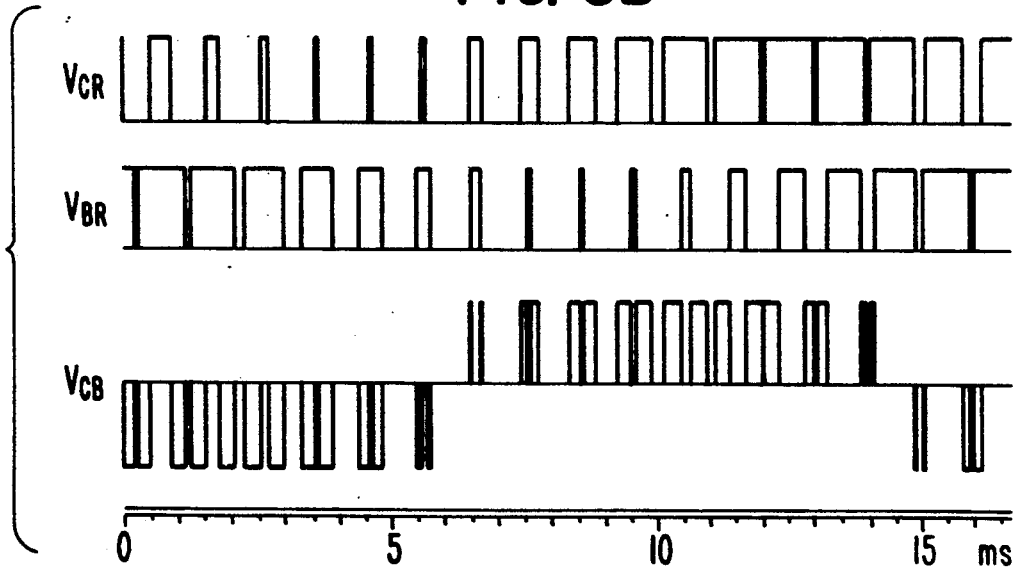

AC MOTOR DRIVE SYSTEM

BACKGROUND OF THE INVENTION

This invention relates in general to induction motor drive systems and, more particularly, to an induction motor drive system for operating a single-phase, two winding induction motor from a two-phase power supply circuit.

A conventional split-phase capacitor start or capacitor run single phase induction motor, also known in the art and referred to hereinafter as a permanent split capacitor (PSC) motor, has two stator windings, a "main" winding and a "start" winding. FIG. 1 illustrates an exemplary PSC motor 100 that includes a main winding 102 and a start winding 104 that are commonly connected at one end. Main winding 102 and start winding 104 are mounted in the stator (not shown) of motor 100 and spatially separated from each other by an angle related to the rated speed of motor 100, e.g., 90° for a two pole, 3600 RPM motor, as is well known in the art. Such PSC motors are designed to be operated with a run capacitor, such as a run capacitor 106, connected in series with start winding 104. It is a typical practice in the industry for the motor manufacturer to not supply the run capacitor with the motor, but instead to only specify parameters of the capacitor, e.g., capacitance and power rating, sufficient to enable a user to procure and install the capacitor.

In the operation of PSC motor 100, main winding 102 and the series combination of start winding 104 and run capacitor 106 are connected in parallel with each other and directly across a single phase power source 110. Since start winding 104 is energized through capacitor 106, the phase angle of the current flowing through start winding 104 is shifted with respect to the current flowing through main winding 102, such that the phase angle between the respective currents flowing in windings 102 and 104 is 90° while the motor is running. The phase angle between the currents in windings 102 and 104 and the spatial separation of those windings result in the creation of a rotating magnetic field which is inductively coupled to the rotor (not shown) of motor 100, to exert a rotational force on the rotor.

The rotor of motor 100 attempts to rotate in synchronism with the rotating magnetic field but lags the rotating magnetic field by a "slip" factor, resulting in a torque on the rotor which is in part proportional to the amount of slip.

The starting torque exerted on the rotor of motor 100 during a starting period when motor 100 is started and accelerated to rated speed is also proportional to the sine of the phase angle between the currents flowing in windings 102 and 104. Therefore, in order to maximize the starting torque, it is necessary to achieve a phase angle of 90° during starting. However, the starting torque for a single phase PSC motor, such as motor 100, is generally poor because the specified parameters of the run capacitor are only optimized for running conditions, not starting conditions. Thus, the capacitance of run capacitor 106 is specified by the manufacturer based on the impedances of windings 102 and 104 that will be experienced during running of motor 100, rather than during starting. However, as known in the art, the apparent values of motor winding impedances vary during the starting period of a PSC motor and are therefore different during starting than during running. As a result of the capacitance of capacitor 106 being optimized for running and not for starting, its magnitude is too small for starting. This results in the phase angle between the currents flowing in windings 102 and 104 being less than 90° during the starting period and the starting torque being less than a maximum possible starting torque.

One solution known in the art to compensate for the insufficient magnitude of capacitor 106 during starting is to connect a starting capacitor 112 across capacitor 106 to increase the total capacitance in series with start winding 104 and thereby increase the current flowing in the start winding, the phase angle and the starting torque of motor 100. Starting capacitor 112 is disconnected, e.g., by means of a centrifugal switch, positive temperature coefficient thermistor (PIC device) or relay, once the motor has reached running speed. Disadvantageously, although operation of starting capacitor 112 generally improves the starting torque of motor 100, its use still does not maximize torque throughout the starting period of motor 100. Ideally, the magnitude of the capacitance in series with start winding 104 would have to be continuously varied during the start period to maintain a desired phase angle while the respective impedances of windings 102 and 104 vary.

Conventional single phase PSC motors are commonly used in heating, ventilating and air-conditioning (HVAC) systems to drive system loads such as fans, pumps and compressors. HVAC systems are subject to widely varying demand cycles due to a variety of factors such as, for example, daily and seasonal fluctuations of ambient temperature, human activity in the controlled environment, and intermittent operation of other equipment in the controlled environment. Accordingly, in order to assure a satisfactory temperature of the controlled environment, the HVAC system must have the heating and/or cooling capacity to accommodate "worst case" conditions. As a result, under less than worst case conditions the HVAC system has a significant over-capacity and is necessarily operated at reduced loading. Since the maximum operating efficiency of a motor, such as a PSC motor, is normally obtained only when the motor is operating at full load, the reduced HVAC system load results in inefficient operation of the motor. Further, to the extent that motors are required to cycle on and off to meet HVAC load requirements less than the capacity of the HVAC system, further significant operating inefficiencies are experienced. Such further inefficiencies include the operating cost of frequent starting of motors as well as a reduction in useful life of such motors resulting from the well known thermal and mechanical stresses experienced during starting.

A solution for overcoming the above inefficiencies resulting from the excessive capacity of an HVAC system is to vary the system capacity to meet the demand on the system. One method for varying HVAC system capacity is by varying the speed of the motors driving the HVAC system loads in accordance with the demand. With respect to HVAC system loads driven by single phase motors, such as PSC motors, in order to effect a desired motor speed control, it would be necessary to vary the frequency of the single phase power supplied to the motor. However, with respect to PSC motors, the run capacitor, e.g., capacitor 106 of motor 100 (FIG. 1), is optimized for a particular set of running conditions, including operation at a nominal frequency, e.g., 60 Hz. As a result, operation of a PSC motor at other than the nominal frequency results in production of less than optimal torque and inefficient operation. While some applications may exist in which very limited speed control of a PSC motor is achieved by a small variation of the single phase source frequency, such variation from the nominal frequency results in less efficient operation since the motor is nevertheless designed for optimum performance at the nominal source frequency.

A conventional implementation of varying motor speed to modulate HVAC system capacity typically requires a two- or three-phase motor supplied with two- or three-phase power, respectively. The use of such polyphase motors and power supplies enables variation of motor speed by varying the frequency of the voltage applied to the motor while maintaining a constant volts/frequency (volts/hertz) ratio. Maintenance of a constant volts/hertz ratio corresponds to maintenance of a constant air gap flux and efficient motor operation while delivering rated torque. The use of polyphase motors also offers several other advantages over that of a single phase motor such as, for example, lower locked rotor currents, higher starting torque, lower full load currents and improved reliability due to elimination of the start and/or run capacitor which are required in single phase motors. Disadvantageously, such polyphase motors are more expensive than single phase motors having the same horsepower rating.

Such applications employing polyphase motors generally require provision of variable frequency polyphase power from either a single phase or polyphase line source by means of a power supply circuit, including a polyphase inverter, coupled between the motor and the line source. One drawback to this arrangement occurs in the event that the power supply circuit fails and it is not possible to connect the polyphase motor directly to the line source, such as, for example when a three-phase motor is driven by an inverter which receives power from a single phase line source. Failure of the power supply circuit therefore results in failure and unavailability of the system utilizing the polyphase motor.

Previous attempts to address the problem of backup power for polyphase motors fed from a single phase power source have required inverter redundancy or additional circuit means for temporarily directly connecting the polyphase motor to the single phase power source. However, the additional circuit means required to "simulate" polyphase power may not provide truly polyphase power and therefore may not drive the polyphase motor at optimum efficiency.

SUMMARY OF THE INVENTION

It is an object of the present invention to provide an AC motor drive system which overcomes the aforementioned problems and disadvantages of conventional drive systems. To achieve the objects and in accordance with the purpose of the invention, as embodied and broadly described herein, the invention is directed to an AC motor drive system for driving an AC motor having a first winding and a second winding, the first winding having first and second ends and a first winding impedance and the second winding having first and second ends and a second winding impedance that is greater than the first impedance. The drive system comprises two-phase power supply means for converting an inputted power supply voltage into a two-phase AC output voltage. The two-phase power supply means has a common terminal, a first phase output terminal, and a second phase output terminal. The common terminal of the two-phase power supply means is adapted for connection to the respective first ends of the first and second windings. The first and second phase terminals of the two-phase power supply means are adapted for connection to the second ends of the first and second windings, respectively. The two-phase power supply means converts the inputted power supply voltage to a two-phase voltage provided on the first, second and common terminals to drive the motor.

In accordance with an embodiment of the invention, the two-phase power supply means includes a pulse width modulated (PWM) inverter system and the inputted power supply is an AC power supply. The drive system includes means for rectifying the inputted AC power supply to provide a DC supply voltage. The PWM inverter system includes a three-phase inverter circuit including input terminals coupled to receive the DC voltage and three output terminals respectively corresponding to the common, first phase and second phase terminals. The PWM system also includes switching means, included in the three-phase inverter circuit, for inverting the DC voltage into the two-phase output voltage, and voltage control means for generating switching control signals for controlling the operation of the switching means such that a first phase of the two-phase output voltage is generated between the first phase and common terminals and a second phase of the two-phase output voltage is generated between the second phase and common terminals.

In accordance with another embodiment of the invention, the AC motor drive system is adapted for connection to a single-phase AC power supply having a line conductor and a neutral conductor. The drive system includes two-phase power supply means, including a line terminal for coupling to the line conductor of the single-phase power supply, for converting the single-phase power supply into a two-phase output voltage. The two-phase power supply means has a first phase output terminal and a second phase output terminal. The respective first ends of the first and second windings of the motor are connected to a neutral terminal of the drive system for connection to the neutral conductor of the single-phase power source. The second ends of the first and second windings of the motor are respectively coupled to the first and second phase terminals of the two-phase power supply means.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate several embodiments of the invention and together with the description, serve to explain the principles of the invention.

FIGS. 8A and 8B are graphical illustrations of voltage waveforms produced during operation of the inverter circuit shown in FIG. 3;

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

In accordance with illustrated embodiments of the present invention, an induction motor drive system is provided in which a two winding, single-phase induction motor, such as a PSC motor, is coupled to a two-phase power supply circuit such that the two motor windings are respectively connected to the two-phases of the power supply circuit. The power supply circuit is configured and operated to provide voltages that result in achieving an optimum phase angle between the motor winding currents during starting and running of the motor. The power supply circuit is further operated to provide variable speed operation of the single-phase motor while maintaining a constant volts/hertz ratio at all operating speeds.

Figure 2:
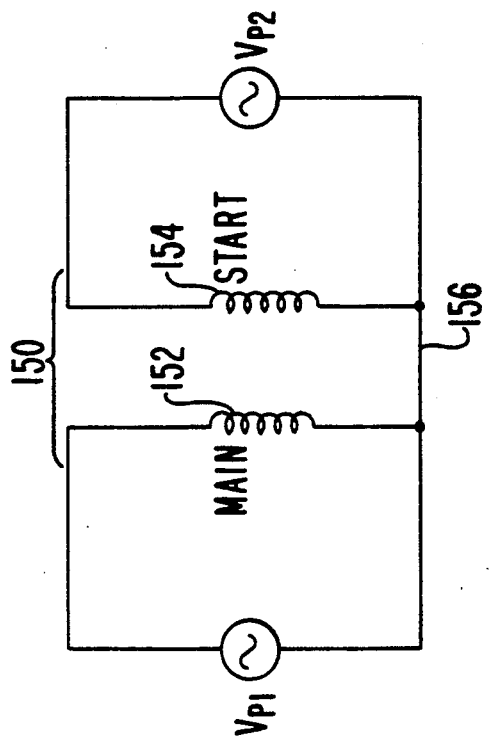
FIG. 2 is a schematic diagram illustrating a motor coupled to a two-phase power supply in accordance with an embodiment of the present invention.
Figure 1:
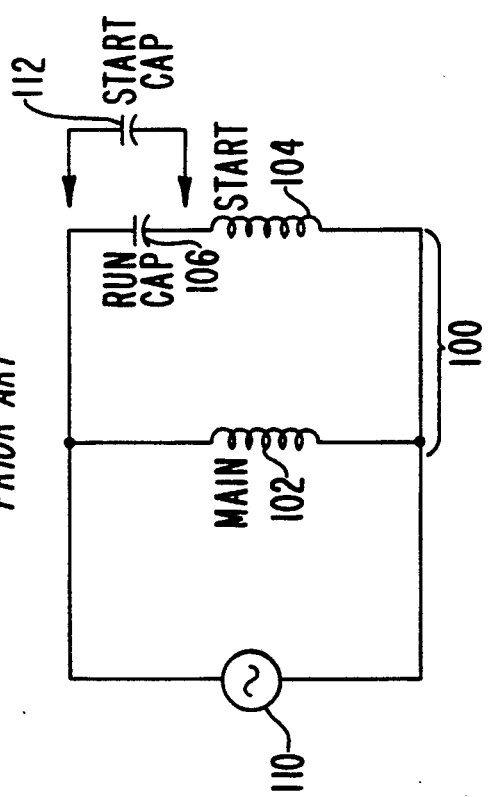
FIG. 1 is a schematic diagram showing a conventional PSC motor coupled to a single-phase power supply.

Referring now to the drawings, FIG. 2 diagrammatically illustrates a two winding, single-phase induction motor 150 coupled to a two-phase power source provided in accordance with an embodiment of the present invention. Motor 150 includes two stator windings, i.e., a main winding 152 and a start winding 154 that are commonly connected at a common winding node 156. Windings 152 and 154 of motor 150 are connected across a first phase voltage $V_{P1}$ and a second phase voltage $V_{P2}$ of a two-phase power source. The two-phase power source is preferably configured and operated to provide phase voltages $V_{P1}$ and $V_{P2}$ with a desired phase angle therebetween, for example 90°, that results in optimum performance of motor 150.

Motor 150 is preferably provided as a conventional PSC motor that does not include a run capacitor. As a result, in accordance with the features of conventional PSC motors, winding 154 is provided with a smaller conductor size and has a greater number of winding turns than winding 152, so that the impedance of winding 154 is greater than that of winding 152. Another characteristic of conventional PSC motors is that during operation from an AC source, a larger voltage is applied across the start winding than across the main winding. This difference in winding voltages results, in part, from the connection of the run capacitor in series with the start winding. For example, with respect to a conventional 230VAC PSC motor connected through a run capacitor to a single-phase 230VAC, 60 Hz source, the voltage applied across the main winding would be approximately 230 V, while the voltage applied across the start winding could be on the order of 20% higher or 276 V.

In view of this difference between winding voltages, it is a feature of the illustrated embodiments of the present invention that the two-phase power source, to which motor 150 is connected, be configured and operated to provide $V_{P2} > V_{P1}$. The relative magnitudes of phase voltages $V_{P1}$ and $V_{P2}$ are preferably selected to duplicate the voltages that would otherwise be experienced by the main and start windings of motor 150 if it was operated at its rated voltage and frequency as a conventional PSC motor including a run capacitor in series with the start winding. However, during variable speed operation of motor 150, the drive system of the invention varies the absolute magnitudes of voltages $V_{P1}$ and $V_{P2}$ to maintain a substantially constant ratio of volts/hertz for each winding while the relative magnitudes of the voltages expressed as a ratio between those voltages, i.e., $V_{P2}/V_{P1}$, is maintained substantially constant, as more fully described below.

In accordance with the illustrated embodiments of the invention, the phase angle difference between the currents respectively flowing in windings 152 and 154 is controlled by operating the two-phase power source to generate the two-phase voltages $V_{P1}$ and $V_{P2}$ with the desired phase angle therebetween, rather than as a result of installing a run capacitor in series with the start winding of the conventional PSC motor. A benefit obtained by such operation of motor 150 is the capability to maintain a selected phase shift between the winding currents independent of motor rotational speed. This allows the motor to deliver a normally specified range of torque at any speed, including at zero speed corresponding to starting, so long as the volts/hertz ratio is held constant. Since the voltages applied to the respective windings of motor 150 have different magnitudes, a different volts/hertz ratio is maintained for each of windings 152 and 154. As more fully described below the power supply circuit for providing the two-phase power source is preferably configured to maintain a constant volts/hertz ratio for each motor winding for the full range of motor shaft speed.

A two-phase power source for supplying phase voltages $V_{P1}$ and $V_{P2}$ in accordance with the present invention can be provided in several different forms. For example, the power source can be provided as a two-phase alternator or two, single-phase alternators driven by a common shaft to provide an adjustable phase shift. Output voltage adjustment of the alternator(s) is accomplished by adjustment of the alternator excitation voltage. In the case of two single-phase alternators, the phase angle can be adjusted by angular adjustment of the respective alternator rotors on the common shaft.

The power source can also be provided as a "Scott connected" transformer configured to change three-phase power into two-phase power. Phase angle adjustment of the Scott transformed output is effected by changing winding taps. Frequency adjustment is effected by varying the frequency of the input voltage.

Figure 3:
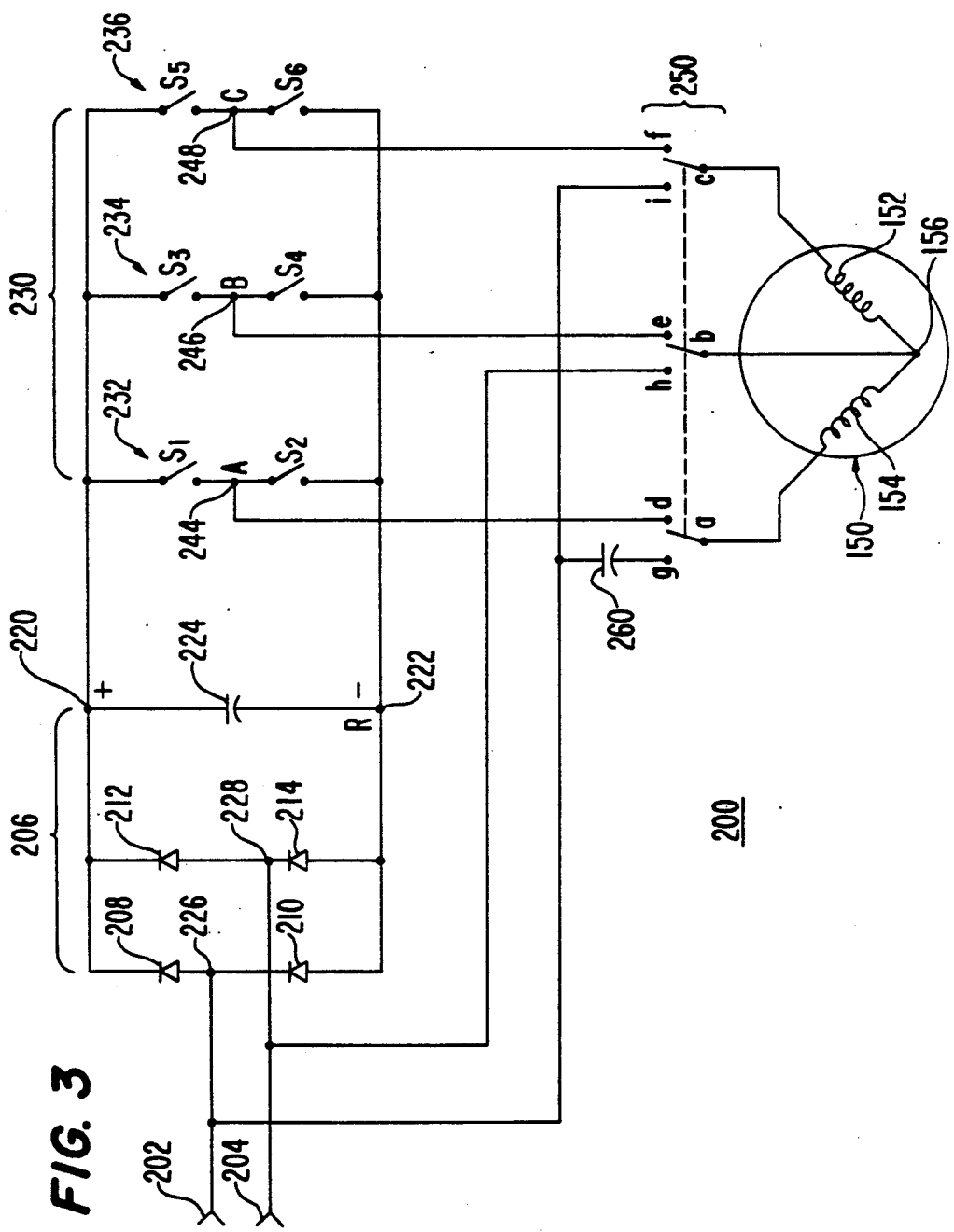
FIG. 3 illustrates a motor drive system constructed in accordance with an embodiment of the present invention.

It is preferred herein that the power source be provided as a power supply circuit, including an inverter, for electronically generating the two-phase power. FIG. 3 illustrates an induction motor drive system 200 constructed in accordance with an embodiment of the invention. System 200 is preferably constructed to include motor 150. System 200 includes line terminals 202 and 204 for connection to a line conductor and a reference or neutral conductor, respectively, of a single-phase AC power source. System 200 also includes a full wave rectifier circuit 206 including a first pair of diodes 208 and 210 connected in series with the polarity shown, and a second pair of diodes 212 and 214 connected in series with the polarity shown and in parallel with the first pair of diodes. Rectifier circuit 206 has a positive output terminal 220 and a negative output terminal 222 and a capacitor 224 connected across output terminals 220 and 222 to filter the DC voltage output of rectifier circuit 206. A tap node 226 between diodes 208 and 210 is connected to line terminal 202, and a tap node 228 between diodes 212 and 214 is connected to line terminal 204.

Rectifier circuit 206 operates in a well-known manner to rectify the single-phase AC voltage applied to line terminals 202 and 204 to provide a DC voltage on its output terminals 220 and 222. The magnitude of the DC voltage on output terminals 220 and 222 is approximately equal to the RMS single-phase voltage on line terminals 202 and 204 multiplied by $\sqrt{2}$.

Figure 4:
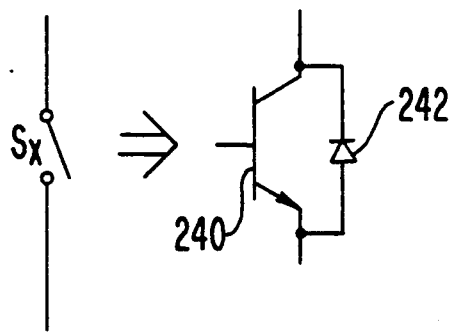
FIG. 4 illustrates a power switching device included in an inverter circuit shown in FIG. 3.

System 200 further includes a three-phase inverter circuit 230 which is connected and operated to provide two-phase power to motor 150, in a manner more fully described below. Inverter circuit 230 includes three parallel connected bridge inverter legs 232, 234 and 236 each formed by two power switching devices connected in series. Referring to FIG. 4, each switch $S_1$–$S_6$ can be provided as a transistor, insulated gate bipolar transistor, F.E.T., G.T.O. device or similar power switching device 240 connected with an accompanying anti-parallel conduction diode 242. Referring again to FIG. 3, bridge legs 232, 234 and 236 of inverter circuit 230 respectively include tap nodes 244, 246 and 248 for connection to motor 150 through a three-pole double throw switch 250. Tap node 244 is connectable to an end of winding 154, tap node 248 is connectable to an end of winding 152 and tap node 246 is connectable to common winding node 156. Tap nodes 244, 246 and 248 respectively correspond to the A, B and C phase output nodes of inverter circuit 230 and are so labelled in FIG. 3. As more fully described below, switches $S_1$–$S_6$ are operated to generate pulse width modulated (PWM) voltages at nodes 244, 246 and 248 that are defined with respect to negative output terminal 222 that also serves as a reference terminal R for defining the PWM voltages.

Switch 250 enables operation of motor 150 by connection to either the single-phase source or the output of inverter circuit 230. Switch 250 includes a first group of terminals a-b-c, a second group of terminals d-e-f, and a third group of terminals g-h-i. The first groups of terminals a, b and c are respectively connected to an end of winding 154, common winding node 156, and an end of winding 152. The second group of winding terminals d, e and f are respectively connected to tap nodes 244, 246 and 248. With respect to the third group of winding terminals, terminals h and i are directly connected to line terminals 204 and 202, respectively, and a run capacitor 260 is connected between terminal g and line terminal 202.

When switch 250 is in a first position connecting terminals a, b and c to terminals d, e and f, respectively, motor 150 is operated in a two-phase mode from the output of inverter circuit 230. When switch 250 is in a second position connecting terminals a, b and c to terminals g, h and i, respectively, motor 150 is operated in a single-phase mode from the single-phase source. During the single-phase mode of operation, run capacitor 260 is connected in series between winding 154 and line terminal 202. Since motor 150 is preferably provided as a conventional PSC motor, capacitor 260 is preferably selected to have the run capacitor characteristics specified by the manufacturer of motor 150, so that motor 150 operates as a conventional PSC motor in the single-phase mode.

Figure 5:
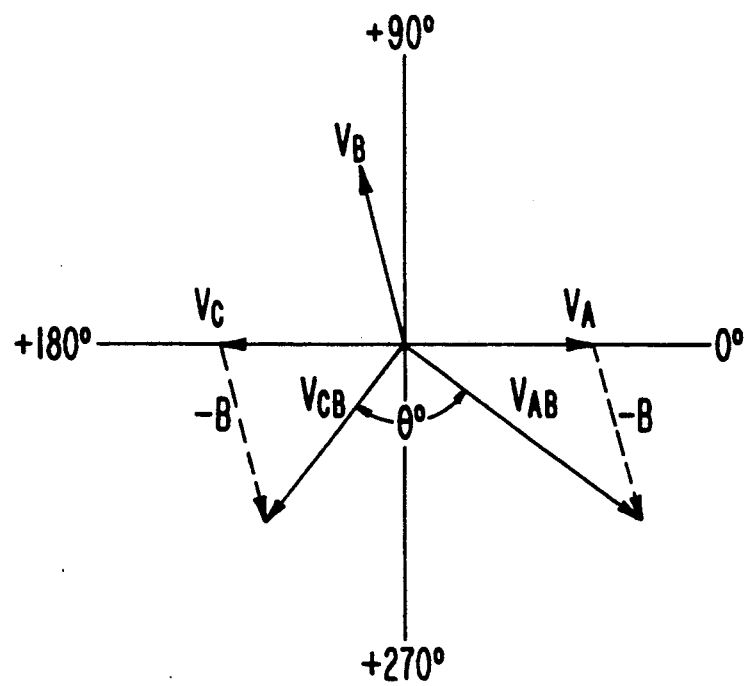
FIG. 5 is a phasor diagram illustrating voltages produced by the inverter circuit of FIG. 3.

FIG. 5 illustrates a phasor diagram for explaining how three-phase inverter circuit 230 can be connected and controlled to supply two-phase power to motor 150. In FIG. 5, the three voltage phasors $V_A$, $V_B$ and $V_C$ correspond to the voltages present at tap nodes 244, 246 and 248 of inverter circuit 230. As a result of the connection of inverter circuit 230 to motor 150 as illustrated in FIG. 3, a volta $V_{AB}$ that is the difference between voltage phasors $V_A$ and $V_B$, is applied across winding 154 and corresponds to voltage $V_{P2}$ in FIG. 2. A voltage $V_{CB}$ that is the difference between voltage phasors $V_C$ and $V_B$, is applied across winding 152 and corresponds to voltage $V_{P1}$ in FIG. 2.

In accordance with the illustrated embodiment of the present invention, although inverter circuit 230 is a three-phase inverter circuit, it is not operated to produce balanced three-phase power. Thus, as seen in FIG. 5, phasor $V_C$ lags phasor $V_A$ by 180° and phasor $V_B$ leads phasor $V_A$ by 105°. Also, phasors $V_A$, $V_B$ and $V_C$ have the same magnitude. In accordance with the invention and in a manner more fully described below, the operation of switches $S_1$ to $S_6$ is controlled to produce voltages $V_{AB}$ and $V_{CB}$ that constitute the two-phase output of inverter circuit 230 and that are separated by the desired phase angle $\Theta$ that corresponds to an optimum performance of motor 150.

As described above and in accordance with the illustrated embodiments of the invention, the magnitude of voltage $V_{AB}$, which is applied across start winding 154, is greater than that of voltage $V_{CB}$, which is applied across main winding 152. Since phasors $V_A$, $V_B$ and $V_C$ are defined to have the same magnitude, the difference in magnitude between voltages $V_{AB}$ and $V_{CB}$ is controlled by the selection of the phase angles between the phasors. As will now be apparent to those skilled in the art, by varying the phase angle of phasor $V_B$ and holding the magnitude and relative phase angles of phasors $V_A$ and $V_C$ constant, the ratio of voltages $V_{AB}/V_{CB}$ can be varied while the phase angle difference between voltages $V_{AB}$ and $V_{CB}$ remains constant. Further, the variation of both the ratio of voltages $V_{AB}/V_{CB}$ and the phase angle therebetween can be accomplished by varying the phase and magnitude of any two of the three phasors $V_A$, $V_B$ and $V_C$. The operating frequency of inverter 230, and hence the speed of motor 150, is varied by varying the respective magnitudes and frequencies of all three phasors $V_A$, $V_B$ and $V_C$ in proportion to a desired operating frequency while holding the phase relationships between the respective phasors constant, in order to maintain a constant volts/hertz ratio for each of windings 152 and 154 and the desired phase angle Θ between the voltages applied to the respective windings.

Figure 6:
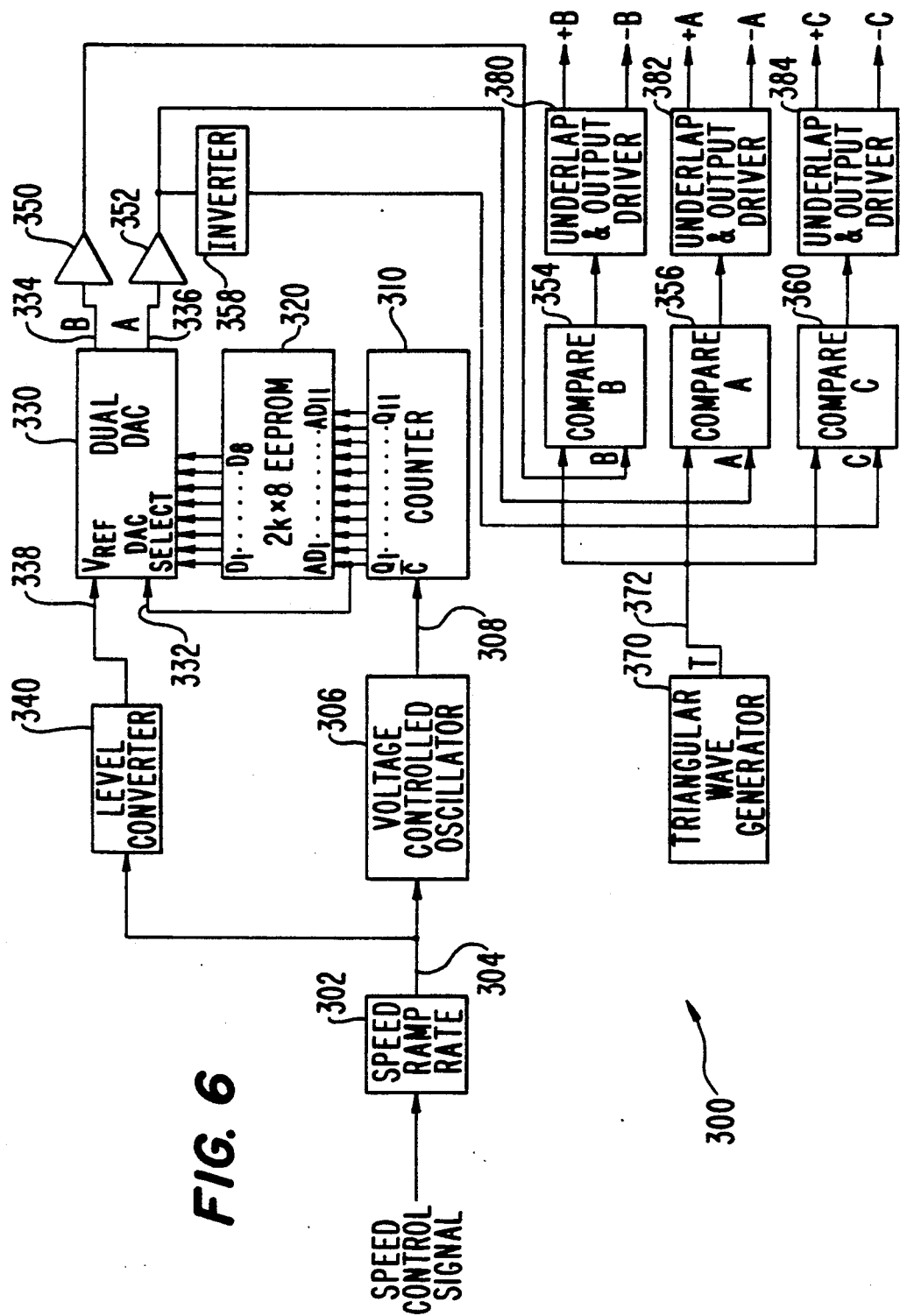
FIG. 6 is a block diagram of a circuit for controlling the operation of the inverter circuit of FIG. 3.
Figure 7:
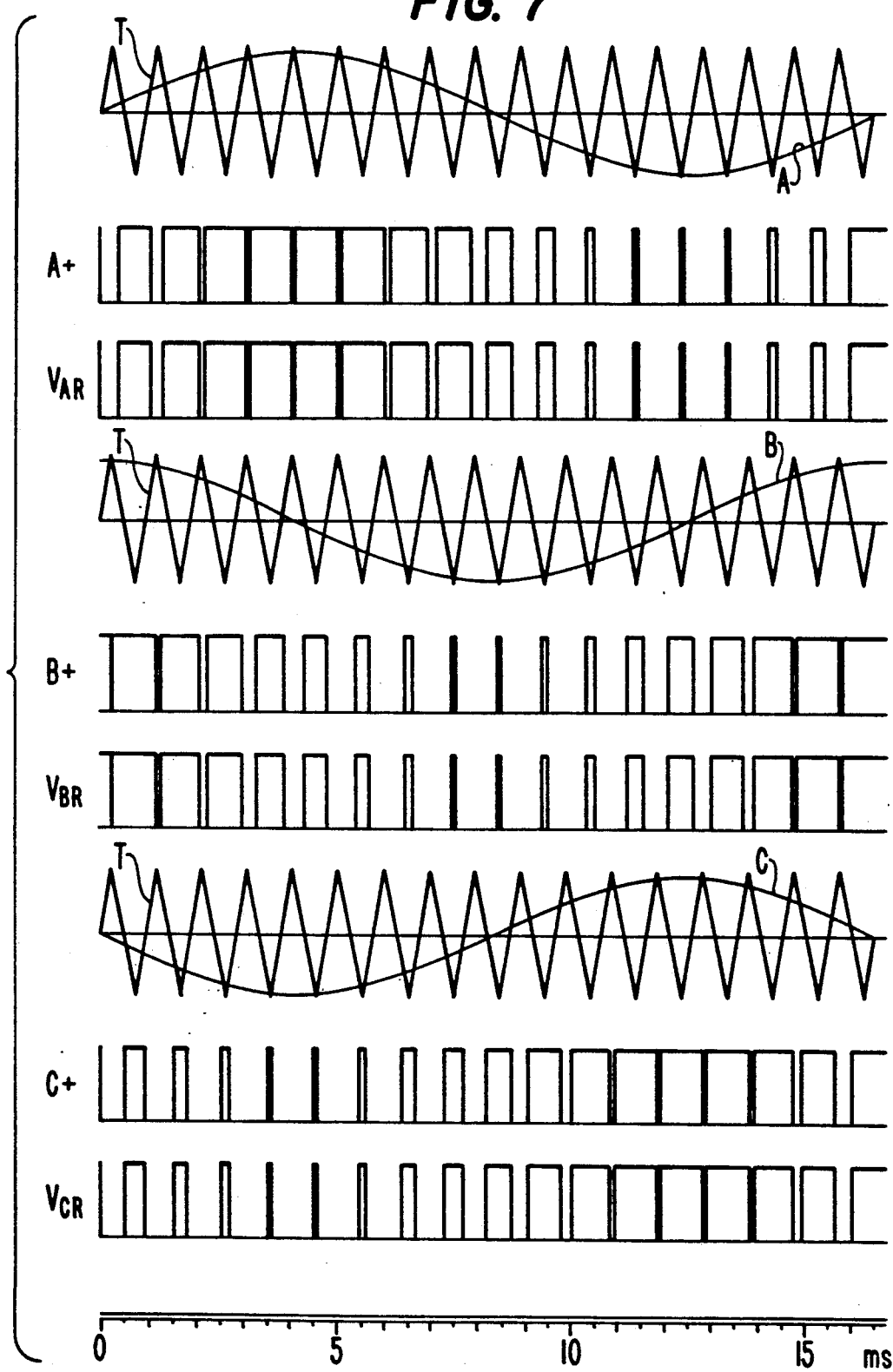
FIG. 7 is a graphical illustration of voltage waveforms produced during operation of the circuits shown in FIGS. 3 and 6.

FIG. 6 shows a block diagram of a control circuit 300 for generating control signals for controlling the operation of switches $S_1$ to $S_6$ to produce voltages corresponding to phasors $V_A$, $V_B$ and $V_C$ as illustrated in FIG. 5, and with phase angle Θ=90° between the voltages applied to the motor windings. FIG. 7 illustrates the waveforms of various signals occurring during operation of control circuit 300.

Referring now to FIG. 6, circuit 300 includes a speed ramp rate circuit 302 connected to receive an externally generated speed control signal that represents a desired operating speed of motor 150. The speed control signal may be derived by sensing some parameter or characteristic of the system, in which motor 150 is incorporated, in order to automatically control the motor speed in response to that sensed information. Alternatively, the speed control signal may be varied by means of an appropriate manually adjustable control, such as a potentiometer. Circuit 302 converts the speed control signal into a DC voltage, in a normalized range of 0 to 5 volts, on its output 304. The specific construction of circuit 302 depends on the nature of the speed control signal. However, for example and without limitation, if the speed control signal is provided as a 0 to 5 VDC signal, then circuit 302 can be provided as an R-C network configured as a low pass filter.

The DC voltage output of circuit 302 is applied to an input of a voltage controlled oscillator (VCO) 306 that provides on its output 308 a square wave having a frequency proportional to the DC voltage applied to the input of VCO 306. For example, VCO 306 provides a square wave output that has a frequency of 0 Hz, 61.44 KHz and 122.88 KHz respectively corresponding to DC voltage inputs of 0, 2.5 and 5 volts. VCO 306 can be provided as a model no. AD654JN manufactured by Analog Devices, Inc. of Norwood, Mass.

Output 308 of VCO 306 is connected to an inverted clock input of a twelve bit binary counter 310. Only eleven counter output terminals, $Q_1$ to $Q_{11}$ of counter 310 are used. Counter 310 can be provided as a model no. MC74HC4040N manufactured by Motorola, Inc. of Phoenix, Ariz.

Circuit 300 also includes a 2K-by-8 bit EEPROM 32 connected to receive on its address inputs $AD_1$ to $AD_{11}$ the output of counter 310 provided on output terminals $Q_1$ to $Q_{11}$. EEPROM 320 has stored therein a look-up table containing digital data values that define sinusoidal waveforms $W_{DA}$ and $W_{DB}$ respectively corresponding to phasors $V_A$ and $V_B$ described above with respect to FIG. 5. In particular, EEPROM 320 stores digital data for waveforms $W_{DA}$ and $W_{DB}$ in digitally weighted form broken into 1024 incremental pieces per sinusoidal cycle. The incremental data for digital waveforms $W_{DA}$ and $W_{DB}$ are alternately stored at successive address locations in EEPROM 320 so that successively address values generated by counter 310 cause EEPROM 320 to produce on its data outputs $D_1$ to $D_{11}$ digital data respectively describing incremental pieces representative of waveforms A and B. EEPROM 320 can be provided as a model no. NMC27C16Q manufactured by National Semiconductor, Inc. of Santa Clara, Calif.

Table 1, shown below, illustrates exemplary values of the incremental data stored in EEPROM 320 corresponding to waveforms A and B.

TABLE 1

| | | | | | | | | | | | | | | | |
|---|---|---|---|---|---|---|---|---|---|---|---|---|---|---|---|
| 0000:80 | FF | 81 | FF | 82 | FF | 83 | FF | 83 | FF | 84 | FF | 85 | FF | 86 | FF |
| 0010:87 | FF | 87 | FF | 88 | FF | 89 | FF | 8A | FF | 8A | FF | 8B | FF | 8C | FF |
| 0020:8D | FF | 8E | FF | 8E | FF | 8F | FF | 90 | FE | 91 | FE | 92 | FE | 92 | FE |
| 0030:93 | FE | 94 | FE | 95 | FE | 95 | FE | 96 | FD | 97 | FD | 98 | FD | 98 | FD |
| 0040:99 | FD | 9A | FD | 9B | FD | 9C | FC | 9C | FC | 9D | FC | 9E | FC | 9F | FC |
| 0050:9F | FB | A0 | FB | A1 | FB | A2 | FB | A3 | FA | A4 | FA | A5 | FA |
| 0060:A5 | FA | A6 | FA | A7 | F9 | A8 | F9 | A8 | F9 | A9 | F9 | AA | F8 | AB | F8 |
| 0070:AB | F8 | AC | F7 | AD | F7 | AE | F7 | AE | F7 | AF | F6 | B0 | F6 | B0 | F6 |
| 0080:B1 | F5 | B2 | F5 | B3 | F5 | B3 | F5 | B4 | F4 | B5 | F4 | B6 | F4 | B6 | F3 |
| 0090:B7 | F3 | B8 | F3 | B8 | F2 | B9 | F2 | BA | F1 | BA | F1 | BB | F1 | BC | F0 |
| 00A0:BD | F0 | BD | F0 | BE | EF | BF | EF | BF | EE | C0 | EE | C1 | EE | C1 | ED |
| 00B0:C2 | ED | C3 | EC | C3 | EC | C4 | EC | C5 | EB | C5 | EB | C6 | EA | C7 | EA |
| 00C0:C7 | E9 | C8 | E9 | C9 | E9 | C9 | E8 | CA | E8 | CA | E7 | CB | E7 | CC | E6 |
| 00D0:CC | E6 | CD | E5 | CE | E5 | CE | E4 | CF | E4 | CF | E3 | D0 | E3 | D1 | E2 |
| 00E0:D1 | E2 | D2 | E1 | D3 | E1 | D3 | E0 | D4 | E0 | D4 | DF | D5 | DF | D5 | DE |
| 00F0:D6 | DE | D7 | DD | D7 | DD | D8 | DC | D8 | DC | D9 | DB | D9 | DB | DA | DA |
| 0100:DB | D9 | DB | D9 | DC | D8 | DC | D8 | DD | D7 | DD | D7 | DE | D6 | DE | D5 |
| 0110:DF | D5 | DF | D4 | E0 | D4 | E0 | D3 | E1 | D3 | E1 | D2 | E2 | D1 | E2 | D1 |
| 0120:E3 | D0 | E3 | CF | E4 | CF | E4 | CE | E5 | CE | E5 | CD | E6 | CC | E6 | CC |
| 0130:E7 | CB | E7 | CA | E8 | CA | E8 | C9 | E9 | C9 | E9 | C8 | E9 | C7 | EA | C7 |
| 0140:EA | C6 | EB | C5 | EB | C5 | EC | C4 | EC | C3 | EC | C3 | ED | C2 | ED | C1 |
| 0150:EE | C1 | EE | C0 | EE | BF | EF | BF | EE | BE | F0 | BD | F0 | BD | B0 | BC |
| 0160:F1 | BB | F1 | BA | F1 | BA | F2 | B9 | F2 | B8 | F3 | B8 | F3 | B7 | F3 | B6 |
| 0170:F4 | B6 | F4 | B5 | F4 | B4 | F5 | B3 | F5 | B3 | F5 | B2 | F5 | B1 | F6 | B0 |
| 0180:F6 | B0 | F6 | AF | F7 | AE | F7 | AE | F7 | AD | F7 | AC | F8 | AB | F8 | AB |
| 0190:F8 | AA | F9 | A9 | F9 | A8 | F9 | A8 | F9 | A7 | FA | A6 | FA | A5 | FA | A5 |
| 01A0:FA | A4 | FA | A3 | FB | A2 | FB | A2 | FB | A1 | FB | A0 | FB | 9F | FC | 9F |
| 01B0:FC | 9E | FC | 9D | FC | 9C | FC | 9C | FD | 9B | FD | 9A | FD | 99 | FD | 98 |
| 01C0:FD | 98 | FD | 97 | FD | 96 | FE | 95 | FE | 95 | FE | 94 | FE | 93 | FE | 92 |
| 01D0:FE | 92 | FE | 91 | FE | 90 | FF | 8F | FF | 8E | FF | 8E | FF | 8D | FF | 8C |
| 01E0:FF | 8B | FF | 8A | FF | 8A | FF | 89 | FF | 88 | FF | 87 | FF | 87 | FF | 86 |
| 01F0:FF | 85 | FF | 84 | FF | 83 | FF | 83 | FF | 82 | FF | 81 | FF | 80 | FF | 7F |
| 0200:FF | 7F | FF | 7E | FF | 7D | FF | 7C | FF | 7C | FF | 7B | FF | 7A | FF | 79 |
| 0210:FF | 78 | FF | 78 | FF | 77 | FF | 76 | FF | 75 | FF | 75 | FF | 74 | FF | 73 |
| 0220:FF | 72 | FF | 71 | FF | 71 | FF | 70 | FE | 6F | FE | 6E | FE | 6D | FE | 6D |
| 0230:FE | 6C | FE | 6B | FE | 6A | FE | 6A | FD | 69 | FD | 68 | FD | 67 | FD | 67 |
| 0240:FD | 66 | FD | 65 | FD | 64 | FC | 63 | FC | 63 | FC | 62 | FC | 61 | FC | 60 |
| 0250:FB | 60 | FB | 5F | FB | 5E | FB | 5D | FB | 5D | FA | 5C | FA | 5B | FA | 5A |
| 0260:FA | 5A | FA | 59 | F9 | 58 | F9 | 57 | F9 | 57 | F9 | 56 | F8 | 55 | F8 | 54 |
| 0270:F8 | 54 | F7 | 53 | F7 | 52 | F7 | 51 | F7 | 51 | F6 | 50 | F6 | 4F | F6 | 4F |

TABLE 1-continued

| | | | | | | | | | | | | |
|---|---|---|---|---|---|---|---|---|---|---|---|---|
| 0280:F5 | 4E | F5 | 4D | F5 | 4C | F5 | 4C | F4 | 4B | F4 | 4A | F4 | 49 | F3 | 49 |
| 0290:F3 | 48 | F3 | 47 | F2 | 47 | F2 | 46 | F1 | 45 | F1 | 45 | F1 | 44 | F0 | 43 |
| 02A0:F0 | 42 | F0 | 42 | EF | 41 | EF | 40 | EE | 40 | EE | 3F | EE | 3E | ED | 3E |
| 02B0:ED | 3D | EC | 3C | EC | 3C | EC | 3B | EB | 3A | EB | 3A | EA | 39 | EA | 38 |
| 02C0:E9 | 38 | E9 | 37 | E9 | 36 | E8 | 36 | E8 | 35 | E7 | 35 | E7 | 34 | E6 | 33 |
| 02D0:E6 | 33 | E5 | 32 | E5 | 31 | E4 | 31 | E4 | 30 | E3 | 30 | E3 | 2F | E2 | 2E |
| 02E0:E2 | 2E | E1 | 2D | E1 | 2C | E0 | 2C | E0 | 2B | DF | 2B | DF | 2A | DE | 2A |
| 02F0:DE | 29 | DD | 28 | DD | 28 | DC | 27 | DC | 27 | DB | 26 | DB | 26 | DA | 25 |
| 0300:D9 | 24 | D9 | 24 | D8 | 23 | DB | 23 | D7 | 22 | D7 | 22 | D6 | 21 | D5 | 21 |
| 0310:D5 | 20 | D4 | 20 | D4 | 1F | D3 | 1F | D3 | 1E | D2 | 1E | D1 | 1D | D1 | 1D |
| 0320:D0 | 1C | CF | 1C | CF | 1B | CE | 1B | CE | 1A | CD | 1A | CC | 19 | CC | 19 |
| 0330:CB | 18 | CA | 18 | CA | 17 | C9 | 17 | C9 | 16 | C8 | 16 | C7 | 16 | C7 | 15 |
| 0340:C6 | 15 | C5 | 14 | C5 | 14 | C4 | 13 | C3 | 13 | C3 | 13 | C2 | 12 | C1 | 12 |
| 0350:C1 | 11 | C0 | 11 | BF | 11 | BF | 10 | BE | 10 | BD | 0F | BD | 0F | BC | 0F |
| 0360:BB | 0E | BA | 0E | BA | 0E | B9 | 0D | B8 | 0D | B8 | 0C | B7 | 0C | B6 | 0C |
| 0370:B6 | 0B | B5 | 0B | B4 | 0B | B3 | 0A | B3 | 0A | B2 | 0A | B1 | 0A | B0 | 09 |
| 0380:B0 | 09 | AF | 09 | AE | 08 | AE | 08 | AD | 08 | AC | 08 | AB | 07 | AB | 07 |
| 0390:AA | 07 | A9 | 06 | A8 | 06 | A8 | 06 | A7 | 06 | A6 | 05 | A5 | 05 | A5 | 05 |
| 03A0:A4 | 05 | A3 | 05 | A2 | 04 | A2 | 04 | A1 | 04 | A0 | 04 | 9F | 04 | 9F | 03 |
| 03B0:9E | 03 | 9D | 03 | 9C | 03 | 9C | 03 | 9B | 02 | 9A | 02 | 99 | 02 | 98 | 02 |
| 03C0:98 | 02 | 97 | 02 | 96 | 02 | 95 | 01 | 95 | 01 | 94 | 01 | 93 | 01 | 92 | 01 |
| 03D0:92 | 01 | 91 | 01 | 90 | 01 | 8F | 00 | 8E | 00 | 8E | 00 | 8D | 00 | 8C | 00 |
| 03E0:8B | 00 | 8A | 00 | 8A | 00 | 89 | 00 | 88 | 00 | 87 | 00 | 87 | 00 | 86 | 00 |
| 03F0:85 | 00 | 84 | 00 | 83 | 00 | 83 | 00 | 82 | 00 | 81 | 00 | 80 | 00 | 7F | 00 |
| 0400:7F | 00 | 7E | 00 | 7D | 00 | 7C | 00 | 7C | 00 | 7B | 00 | 7A | 00 | 79 | 00 |
| 0410:78 | 00 | 78 | 00 | 77 | 00 | 76 | 00 | 75 | 00 | 75 | 00 | 74 | 00 | 73 | 00 |
| 0420:72 | 00 | 71 | 00 | 71 | 00 | 70 | 00 | 6F | 00 | 6E | 01 | 6D | 01 | 6D | 01 |
| 0430:6C | 01 | 6B | 01 | 6A | 01 | 6A | 01 | 69 | 02 | 68 | 02 | 67 | 02 | 67 | 02 |
| 0440:66 | 02 | 65 | 02 | 64 | 02 | 63 | 03 | 63 | 03 | 62 | 03 | 61 | 03 | 60 | 03 |
| 0450:60 | 04 | 5F | 04 | 5E | 04 | 5D | 04 | 5D | 04 | 5C | 05 | 5B | 05 | 5A | 05 |
| 0460:5A | 05 | 59 | 05 | 58 | 06 | 57 | 06 | 57 | 06 | 56 | 06 | 55 | 07 | 54 | 07 |
| 0470:54 | 07 | 53 | 08 | 52 | 08 | 51 | 08 | 51 | 08 | 50 | 09 | 4F | 09 | 4F | 09 |
| 0480:4E | 0A | 4D | 0A | 4C | 0A | 4C | 0A | 4B | 0B | 4A | 0B | 49 | 0B | 49 | 0C |
| 0490:48 | 0C | 47 | 0C | 47 | 0D | 46 | 0D | 45 | 0E | 45 | 0E | 44 | 0E | 43 | 0F |
| 04A0:42 | 0F | 42 | 0F | 41 | 10 | 40 | 10 | 40 | 11 | 3F | 11 | 3E | 11 | 3E | 12 |
| 04B0:3D | 12 | 3C | 13 | 3C | 13 | 3B | 13 | 3A | 14 | 3A | 14 | 39 | 15 | 38 | 15 |
| 04C0:38 | 16 | 37 | 16 | 36 | 16 | 36 | 17 | 35 | 17 | 35 | 18 | 34 | 18 | 33 | 19 |
| 04D0:33 | 19 | 32 | 1A | 31 | 1A | 31 | 1B | 30 | 1B | 30 | 1C | 2F | 1C | 2E | 1D |
| 04E0:2E | 1D | 2D | 1E | 2C | 1E | 2C | 1F | 2B | 1F | 2B | 20 | 2A | 20 | 2A | 21 |
| 04F0:29 | 21 | 28 | 22 | 28 | 22 | 27 | 23 | 27 | 23 | 26 | 24 | 26 | 24 | 25 | 25 |
| 0500:24 | 26 | 24 | 26 | 23 | 27 | 23 | 27 | 22 | 28 | 22 | 28 | 21 | 29 | 21 | 2A |
| 0510:20 | 2A | 20 | 2B | 1F | 2B | 1F | 2C | 1E | 2C | 1E | 2D | 1D | 2E | 1D | 2E |
| 0520:1C | 2F | 1C | 30 | 1B | 30 | 1B | 31 | 1A | 31 | 1A | 32 | 19 | 33 | 19 | 33 |
| 0530:18 | 34 | 18 | 35 | 17 | 35 | 17 | 36 | 16 | 36 | 16 | 37 | 16 | 38 | 15 | 38 |
| 0540:15 | 39 | 14 | 3A | 14 | 3A | 13 | 3B | 13 | 3C | 13 | 3C | 12 | 3D | 12 | 3E |
| 0550:11 | 3E | 11 | 3F | 11 | 40 | 10 | 40 | 10 | 41 | 0F | 42 | 0F | 42 | 0F | 43 |
| 0560:0E | 44 | 0E | 45 | 0E | 45 | 0D | 46 | 0D | 47 | 0C | 47 | 0C | 48 | 0C | 49 |
| 0570:0B | 49 | 0B | 4A | 0B | 4B | 0A | 4C | 0A | 4C | 0A | 4D | 0A | 4E | 09 | 4F |
| 0580:09 | 4F | 09 | 50 | 08 | 51 | 08 | 51 | 08 | 52 | 08 | 53 | 07 | 54 | 07 | 54 |
| 0590:07 | 55 | 06 | 56 | 06 | 57 | 06 | 57 | 06 | 58 | 05 | 59 | 05 | 5A | 05 | 5A |
| 05A0:05 | 5B | 05 | 5C | 04 | 5D | 04 | 5D | 04 | 5E | 04 | 5F | 04 | 60 | 03 | 60 |
| 05B0:03 | 61 | 03 | 62 | 03 | 63 | 03 | 63 | 02 | 64 | 02 | 65 | 02 | 66 | 02 | 67 |
| 05C0:02 | 67 | 02 | 68 | 02 | 69 | 01 | 6A | 01 | 6A | 01 | 6B | 01 | 6C | 01 | 6D |
| 05D0:01 | 6D | 01 | 6E | 01 | 6F | 00 | 70 | 00 | 71 | 00 | 71 | 00 | 72 | 00 | 73 |
| 05E0:00 | 74 | 00 | 75 | 00 | 75 | 00 | 76 | 00 | 77 | 00 | 78 | 00 | 78 | 00 | 79 |
| 05F0:00 | 7A | 00 | 7B | 00 | 7C | 00 | 7C | 00 | 7D | 00 | 7E | 00 | 7F | 00 | 80 |
| 0600:00 | 80 | 00 | 81 | 00 | 82 | 00 | 83 | 00 | 83 | 00 | 84 | 00 | 85 | 00 | 86 |
| 0610:00 | 87 | 00 | 87 | 00 | 88 | 00 | 89 | 00 | 8A | 00 | 8A | 00 | 8B | 00 | 8C |
| 0620:00 | 8D | 00 | 8E | 00 | 8E | 00 | 8F | 01 | 90 | 01 | 91 | 01 | 92 | 01 | 92 |
| 0630:01 | 93 | 01 | 94 | 01 | 95 | 01 | 95 | 02 | 96 | 02 | 97 | 02 | 98 | 02 | 98 |
| 0640:02 | 99 | 02 | 9A | 02 | 9B | 03 | 9C | 03 | 9C | 03 | 9D | 03 | 9E | 03 | 9F |
| 0650:04 | 9F | 04 | A0 | 04 | A1 | 04 | A2 | 04 | A2 | 05 | A3 | 05 | A4 | 05 | A5 |
| 0660:05 | A5 | 05 | A6 | 06 | A7 | 06 | A8 | 06 | A8 | 06 | A9 | 07 | AA | 07 | AB |
| 0670:07 | AB | 08 | AC | 08 | AD | 08 | AE | 08 | AE | 09 | AF | 09 | B0 | 09 | B0 |
| 0680:0A | B1 | 0A | B2 | 0A | B3 | 0A | B3 | 0B | B4 | 0B | B5 | 0B | B6 | 0C | B6 |
| 0690:0C | B7 | 0C | B8 | 0D | B8 | 0D | B9 | 0E | BA | 0E | BA | 0E | BB | 0F | BC |
| 06A0:0F | BD | 0F | BD | 10 | BE | 10 | BF | 11 | BF | 11 | C0 | 11 | C1 | 12 | C1 |
| 06B0:12 | C2 | 13 | C3 | 13 | C3 | 13 | C4 | 14 | C5 | 14 | C5 | 15 | C6 | 15 | C7 |
| 06C0:16 | C7 | 16 | C8 | 16 | C9 | 17 | C9 | 17 | CA | 18 | CA | 18 | CB | 19 | CC |
| 06D0:19 | CC | 1A | CD | 1A | CE | 1B | CE | 1B | CF | 1C | CF | 1C | D0 | 1D | D1 |
| 06E0:1D | D1 | 1E | D2 | 1E | D3 | 1F | D3 | 1F | D4 | 20 | D4 | 20 | D5 | 21 | D5 |
| 06F0:21 | D6 | 22 | D7 | 22 | D7 | 23 | D8 | 23 | D8 | 24 | D9 | 24 | D9 | 25 | DA |
| 0700:26 | DB | 26 | DB | 27 | DC | 27 | DC | 28 | DD | 28 | DD | 29 | DE | 2A | DE |
| 0710:2A | DF | 2B | DF | 2B | E0 | 2C | E0 | 2C | E1 | 2D | E1 | 2E | E2 | 2E | E2 |
| 0720:2F | E3 | 30 | E3 | 30 | E4 | 31 | E4 | 31 | E5 | 32 | E5 | 33 | E6 | 33 | E6 |
| 0730:34 | E7 | 35 | E7 | 35 | E8 | 36 | E8 | 36 | E9 | 37 | E9 | 38 | E9 | 38 | EA |
| 0740:39 | EA | 3A | EB | 3A | EB | 3B | EC | 3C | EC | 3C | EC | 3D | ED | 3E | ED |
| 0750:3E | EE | 3F | EE | 40 | EE | 40 | EF | 41 | EF | 42 | F0 | 42 | F0 | 43 | F0 |
| 0760:44 | F1 | 45 | F1 | 45 | F1 | 46 | F2 | 47 | F2 | 47 | F3 | 48 | F3 | 49 | F3 |
| 0770:49 | F4 | 4A | F4 | 4B | F4 | 4C | F5 | 4C | F5 | 4D | F5 | 4E | F5 | 4F | F6 |
| 0780:4F | F6 | 50 | F6 | 51 | F7 | 51 | F7 | 52 | F7 | 53 | F7 | 54 | F8 | 54 | F8 |
| 0790:55 | F8 | 56 | F9 | 57 | F9 | 57 | F9 | 58 | F9 | 59 | FA | 5A | FA | 5A | FA |

TABLE 1-continued

| 07A0:5B | FA | 5C | FA | 5D | FB | 5D | FB | 5E | 5B | 5F | FB | 60 | FB | 60 | FC |
|---|---|---|---|---|---|---|---|---|---|---|---|---|---|---|---|
| 07B0:61 | FC | 62 | FC | 63 | FC | 63 | FC | 64 | FD | 65 | FD | 66 | FD | 67 | FD |
| 07C0:67 | FD | 68 | FD | 69 | FD | 6A | FE | 6A | FE | 6B | FE | 6C | FE | 6D | FE |
| 07D0:6D | FE | 6E | FE | 6F | FE | 70 | FF | 71 | FF | 71 | FF | 72 | FF | 73 | FF |
| 07E0:74 | FF | 75 | FF | 75 | FF | 76 | FF | 77 | FF | 78 | FF | 78 | FF | 79 | FF |
| 07F0:7A | FF | 7B | FF | 7C | FF | 7C | FF | 7D | FF | 7E | FF | 7F | FF | 80 | FF |

The left-hand column of Table 1 lists each successive seventeenth storage address of EEPROM 320 in hexidecimal form. The remaining columns of Table 1 list the waveform data values which are also in hexidecimal form. In particular, the sixteen data values to the right of an address correspond to the data value stored at that address and the fifteen data values respectively stored at the next fifteen successive addresses. For example, the data value BD is stored at address 00A0, while the data values F0, BD, F0, etc. are respectively stored at addresses 00A1, 00A2, 00A3, etc. Further, since data values for waveforms $W_{DA}$ and $W_{DB}$ are alternately stored at successive locations, the data values for waveform $W_{DA}$ are stored at addresses 00A0, 00A2, etc., while that data values for waveform $W_{DB}$ are stored at addresses 00A1, 00A3, etc.

Referring again to FIG. 6, the data outputs $D_1$ to $D_8$ of EEPROM 320 are applied to a digital input of a multiplying dual digital-to-analog converter (DAC) circuit 330. DAC circuit 330 includes a DAC select input 332 which is connected to receive the $Q_1$ counter output of counter 310. DAC circuit 330 converts to analog form the digital data it receives from EEPROM 320 and provides the analog results on either of its output 334 or 336 depending on the binary value applied to its DAC select input 332. Since counter output $Q_1$ is the least significant bit of the output of counter 310, DAC circuit 330 provides each successive analog output, corresponding to each successive digital data input, alternately on its output 334 and 336. In the illustrated embodiment, sinusoidal analog waveforms A and B, representative of voltage phasors $V_A$ and $V_B$, are respectively provided on outputs 336 and 334. FIG. 7 illustrates sinusoidal analog waveforms A and B provided on outputs 336 and 334 of DAC circuit 330. In accordance with the illustrated embodiment and the data listed in Table 1, waveforms A and B have the same magnitude and a phase angle therebetween of 105°, as noted above with respect to phasors $V_A$ and $V_B$ (FIG. 5).

DAC circuit 330 is further connected to receive a voltage scaling signal on a $V_{REF}$ input 338. In accordance with the magnitude of voltage scaling signal, DAC circuit 330, by operation of its multiplying function, scales the magnitude of its analog output in proportion to the voltage scaling signal. The voltage scaling signal is generated by a level converter circuit 340 that is connected to receive the DC voltage provided on output 304 of circuit 302. Circuit 340 is configured to generate the scaling signal as a DC voltage in proportion to the desired operating speed of motor 150 so that a predetermined constant volts/hertz ratio can be maintained for the voltage applied to each winding of motor 150. As a result, for example, the analog sinusoidal waveform voltage output by DAC circuit 330 on either output 334 or 336 has a peak-to-peak magnitude approximately ranging from 0 volts to 2.5 volts respectively corresponding to output voltages on output 304 of circuit 302 ranging from 0 volts to 5 volts. Circuit 340 can be provided as a resistive divider circuit. DAC circuit 330 can be provided as a model no. AD7528 CMOS dual 8-bit buffered multiplying DAC manufactured by Analog Devices, Inc. of Norwood, Mass. That model DAC has two $V_{REF}$ inputs which are conductively tied together for practicing the illustrated embodiment.

Still referring to FIG. 6, the analog waveforms B and A provided on outputs 334 and 336 of DAC circuit 330, respectively corresponding to digital waveforms $W_{DB}$ and $W_{DA}$ and to phasors $V_B$ and $V_A$ (FIG. 5), are applied through conventional analog buffer circuits 350 and 352 to first inputs of comparator circuits 354 and 356. In accordance with this illustrated embodiment of the invention, voltage phasor $V_C$ has the same magnitude as phasor $V_A$ but lags phasor $V_A$ by 180°, as illustrated in FIG. 5. Therefore, the output of buffer circuit 352 is inverted by an analog inverter circuit 358 to create an analog waveform C representative of phasor $V_C$ which is applied to a first input of a comparator circuit 360. Waveform C is illustrated in FIG. 7.

Circuit 300 additionally includes a triangular wave generator 370 that generates a triangular waveform T on its output 372. The generated triangular waveform T can, for example, have a peak-to-peak magnitude that varies from 1.25 to 3.75 volts and a frequency in the range of approximately 900 Hz to 1100 Hz. The frequency of the triangular waveform T determines the frequency at which switching signals are generated for application to switches $S_1$ to $S_6$ of inverter circuit 200. Triangular wave generator 370 can be provided as a circuit including an operational amplifier and a comparator, having a construction well known in the art. With respect to circuit 300, it is preferred that triangular waveform T have a peak-to-peak magnitude of 2.5 volts and a frequency of 1000 Hz.

The triangular waveform T generated on output 372 of generator 370 is applied to a second input of each of comparators 354, 356 and 360. FIG. 7 illustrates triangular waveform T superposed on each of waveforms A, B and C, as received by comparators 356, 354 and 360, respectively. Each of comparators 354, 356 and 360 generates on its output either a high logic level voltage, e.g., 5 volts, or a low logic level voltage, e.g., 0 volts, according to whether the magnitude of the applied analog waveform voltage A, B or C is respectively greater or less than the magnitude of triangular waveform T. As a result, the output of each comparator constitutes a pulse width modulated waveform.

The pulse width modulated waveforms output by comparators 354, 356 and 360 are respectively applied to underlap and output driver circuits 380, 382 and 384. Circuit 380 is configured to generate a first switch driving signal B+ that has substantially the same form as the pulse width modulated waveform applied thereto and a voltage level sufficient to drive switching device $S_3$ (FIG. 3). Circuit 380 also includes a logic inverter circuit for generating a switch driving signal B— that is the logical complement of waveform B+ and having a voltage level sufficient to drive switching device $S_4$ (FIG. 3). Circuit 380 further includes underlap circuitry to insure that signals B+ and B— never cause the respective switching devices to which they are applied to turn on at the same time, thereby providing for the time delay between the logic level turn-off command and the actual interruption of current by the switching device.

Circuits 382 and 384 are configured in the same way as circuit 380 so that circuit 382 provides switch driving signals A+ and A− for respectively driving switches $S_1$ and $S_2$, and circuit 384 provides switch driving signals C+ and C− for respectively driving switches $S_5$ and $S_6$. FIG. 7 illustrates switch driving signals A+, B+ and C+.

In the operation of inverter circuit 230 and control circuit 300, circuit 300 generates switch driving signals A+, A−, B+, B−, C+ and C− which are applied to respectively drive switches $S_1$–$S_6$, such that a switch is driven closed when the driving signal applied thereto assumes a positive logic value. As a result of the pulse width modulated (PWM) closures of switches $S_1$–$S_6$, PWM voltages are applied to windings 152 and 154 of motor 150. For example, the operation of switches $S_1$ and $S_2$ results in generation at node 244 of a PWM voltage $V_{AR}$ that is applied to one end of winding 154. Similarly, the operation of switches $S_3$–$S_6$ results in generation of PWM voltages $V_{BR}$ and $V_{CR}$ that are respectively applied to common winding node 156 and an end of winding 152. PWM voltages $V_{AR}$, $V_{BR}$ and $V_{CR}$ are illustrated in FIG. 7 and respectively correspond to previously described phasors $V_A$, $V_B$ and $V_C$ (FIG. 5). It is noted that the magnitudes of PWM voltages $V_{AR}$, $V_{BR}$ and $V_{CR}$ are a function of the magnitude of DC voltage provided by rectifier circuit 206.

Application of PWM voltages $V_{AR}$, $V_{BR}$ and $V_{CR}$ to motor 150 results in application of voltages $V_{AB}$ and $V_{CB}$ (FIG. 5) as PWM voltages, respectively across windings 154 and 152. FIG. 8A illustrates PWM voltages $V_{AR}$, $V_{BR}$ and $V_{AB}$, while FIG. 8B illustrates PWM voltages $V_{BR}$, $V_{CR}$ and $V_{CB}$. In accordance with the well known operation of pulse width modulated inverter circuits, the pulse width modulated voltage waveforms applied to motor 150 closely simulate the sinusoidal waveforms they correspond to. The operating speed of motor 150 can be varied in response to the speed control signal. During such variation, a constant volts/hertz ratio is maintained for the voltage applied to each winding 152 and 154 of motor 150 by operation of the multiplying function of DAC circuit 330 in accordance with the voltage scaling signal provided by level converter circuit 340. Further, while the magnitudes of the voltages $V_{AB}$ and $V_{CB}$ applied to motor 150 are varied during variable speed operation, the ratio between those voltages, i.e., their relative magnitudes, is maintained constant since the relative phase angles between voltage phasors $V_A$, $V_B$, and $V_C$ are fixed by the data stored in EEPROM 320.

During starting of motor 150, assuming operation at rated speed is desired, the speed control signal can initially require such full speed operation, which would result in an initial application of full voltage across the motor windings. This in turn would result in large motor inrush currents. It would therefore be necessary to provide switches $S_1$–$S_6$ with a current rating sufficient to accommodate such inrush currents. Alternatively, still assuming that operation at rated speed is desired, and in accordance with known inverter operating practices, the speed control signal could initially be generated to require a low speed corresponding to the rated slip of the motor, i.e., approximately 2–5% of rated speed, so that no more than rated current flows initially. The motor could then be accelerated to rated speed by steadily increasing the magnitude of the speed control signal.

Figure 9:
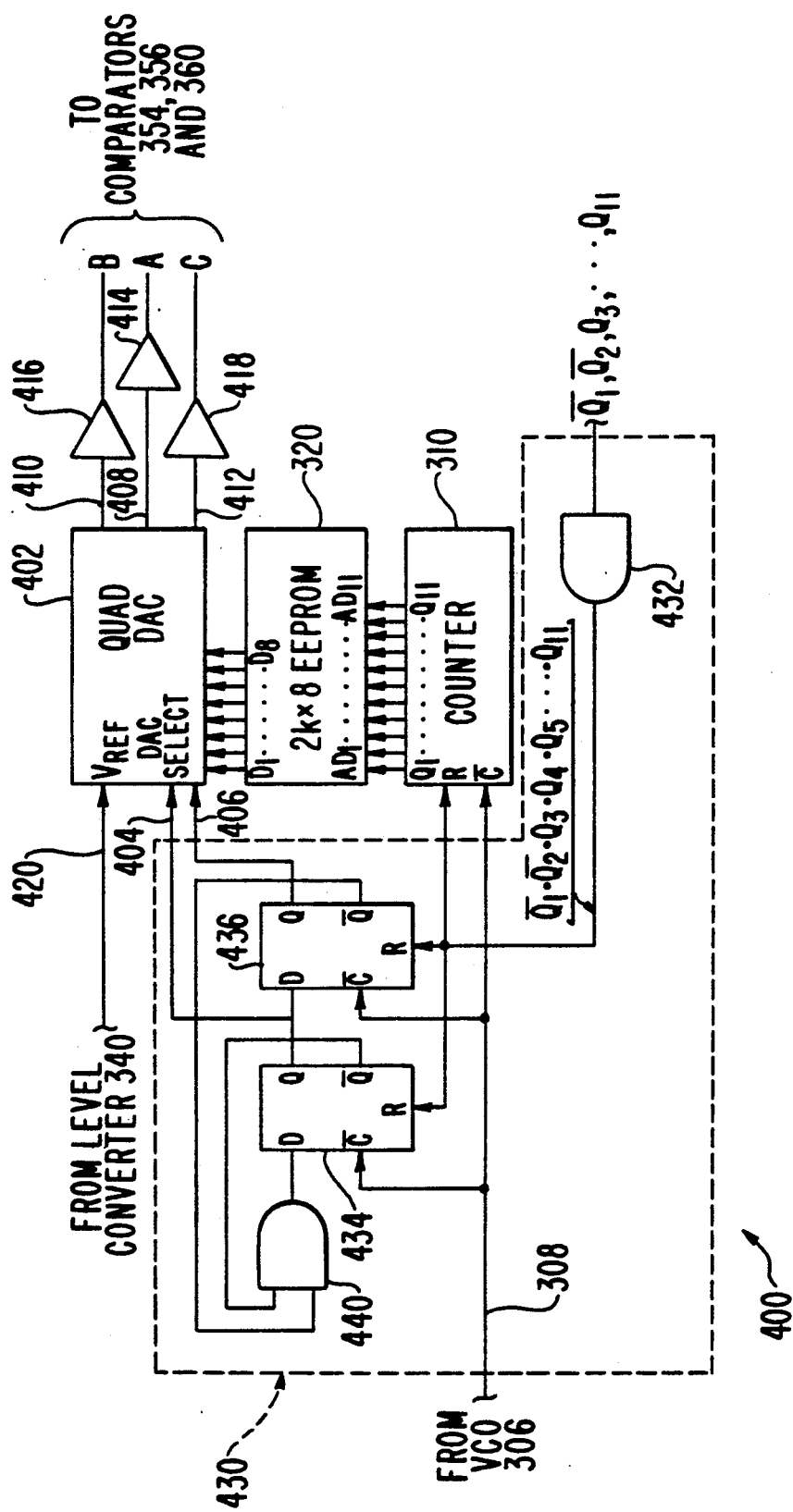
FIG. 9 is a block diagram of an alternate embodiment of the circuit shown in FIG. 6.

FIG. 9 illustrates as a control circuit 400 an alternate embodiment of control circuit 300 illustrated in FIG. 6. Control circuit 400 has the same construction as that of circuit 300 except for the portion shown in FIG. 9. The difference between circuits 300 and 400 is that the latter circuit stores in EEPROM 320 incremental digital data for a waveform $W_{DC}$ to enable independent generation of analog waveform C instead of its generation by inversion of analog waveform A.

Referring to FIG. 9, control circuit 400 includes a multiplying quad digital-to-analog converter (DAC) circuit 402 that is converted to receive the eleven bit digital data output from EEPROM 320. DAC circuit 402 includes a two bit DAC select input consisting of two select inputs 404 and 406. DAC circuit 402 converts to analog form the digital data it receives from EEPROM 320 and provides the analog output on one of its three outputs 408, 410 or 412 depending on the two bit binary value applied to its DAC select inputs 404 and 406. Outputs 408, 410 and 412 are connected through conventional buffer circuits 414, 416 and 418 to comparator circuits 356, 354 and 360, respectively. DAC circuit 402 is also connected to receive the voltage scaling signal on a $V_{REF}$ input 420 to perform a multiplying function in the same manner and for the same purpose as previously described for DAC circuit 330. DAC circuit 402 can be provided as a model no. AD7225 quad 8-bit DAC manufactured by Analog Devices, Inc. of Norwood, Mass. That model DAC has four $V_{REF}$ inputs which would be conductively tied together for practicing the illustrated embodiment.

Circuit 400 also includes a timing circuit 430 for generating a sequence of two bit signals for application to DAC select inputs 404 and 406. Timing circuit 430 includes an AND gate 432 which is connected to receive outputs $Q_1$–$Q_{11}$ of counter 310, with outputs $Q_1$ and $Q_2$ being inverted prior to application to AND gate 432, by circuitry not shown. Circuit 430 also includes flip-flop circuits 434 and 436 each having a reset input R connected to receive the sum output signal provided by AND gate 432. The output signal of AND gate 432 is also applied to a reset input R of counter 310. Each of flip-flops 434 and 436 is also connected to receive on an inverted clock input C the signal provided on output 308 of VCO 306. An inverted data output Q of each of flip-flops 434 and 436 is applied to an AND gate 440 the output of which is applied to a data input D of flip-flop 434. A data output Q of flip-flop 434 is connected to both a data input D of flip-flop 436 and DAC select input 404 of DAC circuit 402. A data output Q of flip-flop 436 is connected to DAC select input 406.

Figure 10:
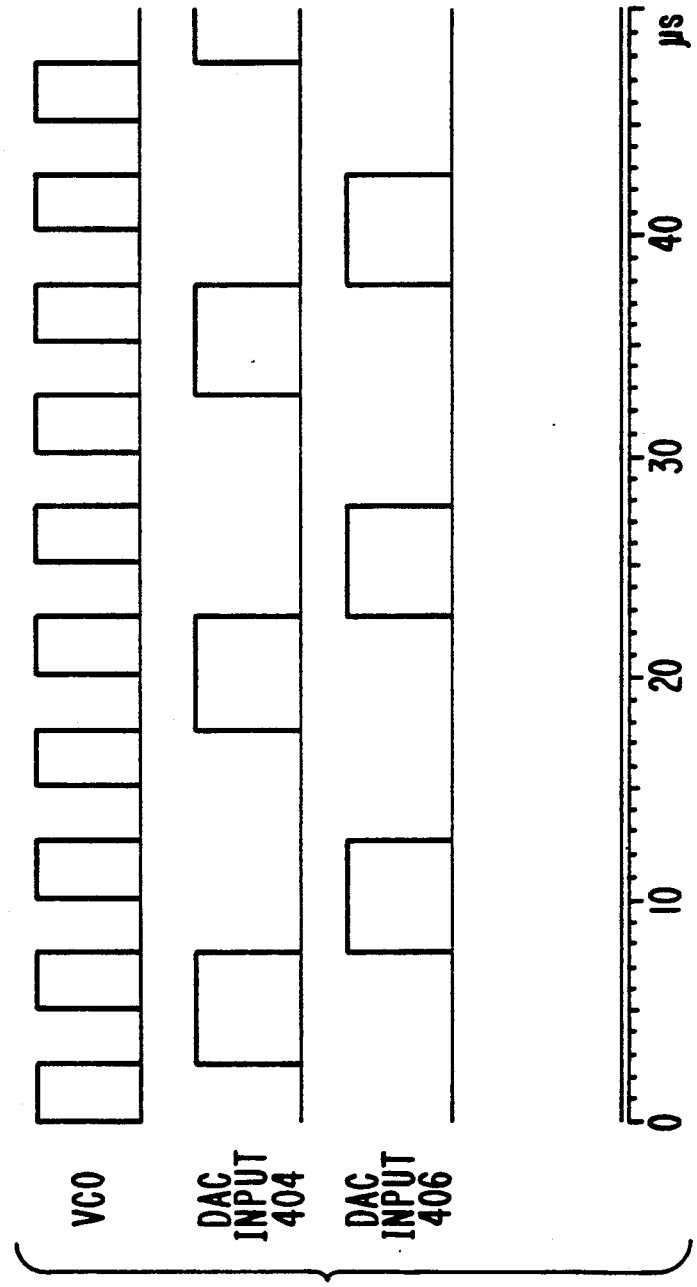
FIG. 10 is a graphical illustration of voltage waveforms produced during operation of the circuit shown in FIG. 9.

In the operation of control 400, timing circuit 430 generates for application to DAC select inputs 404 and 406 the repeating sequence of two bit logic signals 00, 10, 01, 00, 10, 01, . . . . FIG. 10 illustrates plots of the signals generated by VCO 306 and by timing circuit 430 for application to DAC select inputs 404 and 406 relative to a common time axis. In FIG. 10, the signal generated by VCO 306 has a frequency of 122.76 KHz. As a result, DAC circuit 402 is controlled to sequentially provide on its outputs 408, 410 and 412, in analog form the incremental data for analog waveforms A, B and C. Since in the illustrated embodiment EEPROM 320 is provided with an approximate 2K byte storage capacity, the digital data for waveforms $W_{DA}$, $W_{DB}$ and $W_{DC}$ is stored in digitally weighted form broken into 682 incremental pieces per sinusoidal cycle. The sum signal applied to the reset input R of counter 310 causes the counter to reset its output after sequencing through the range of addresses of EEPROM 320.

Figure 11:
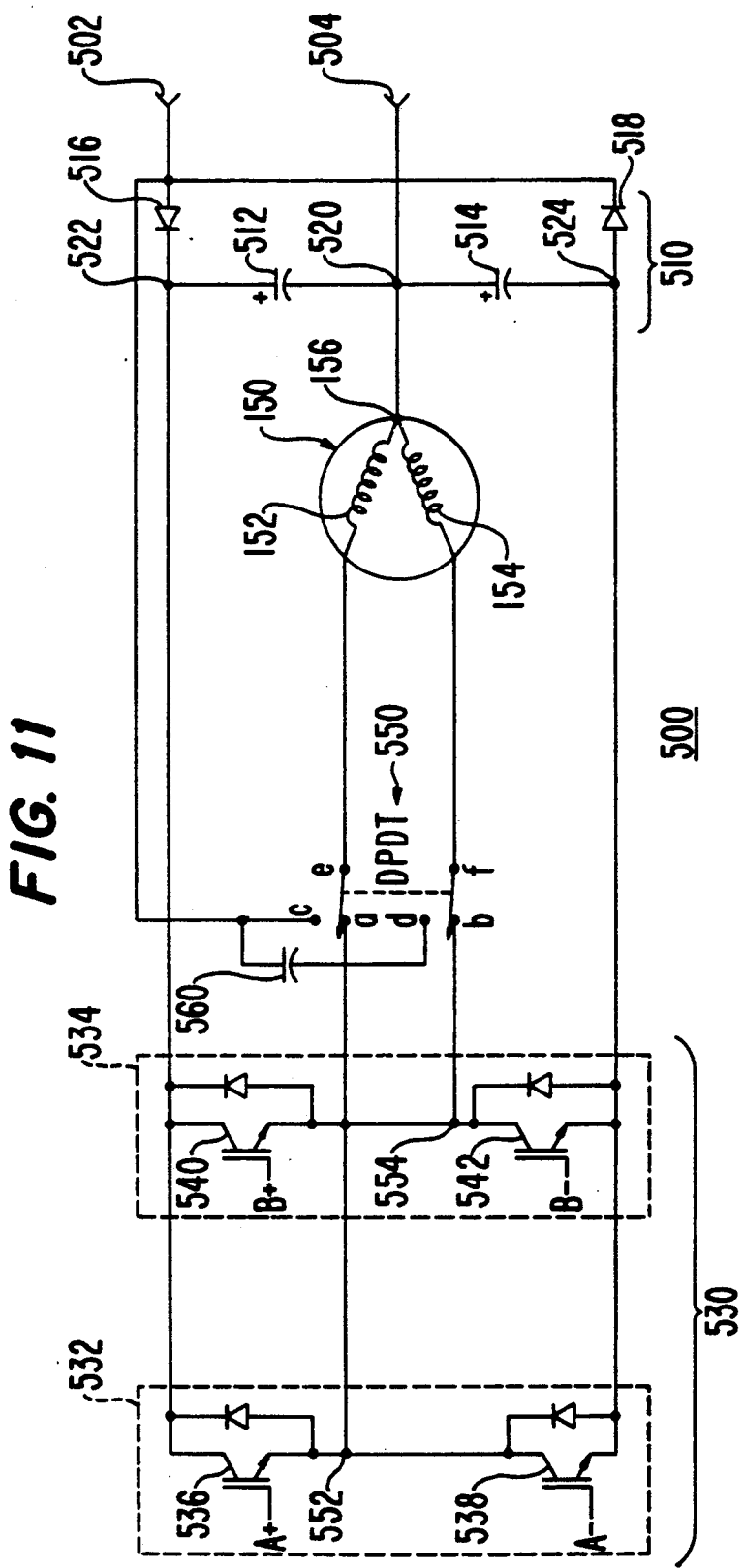
FIG. 11 illustrates a motor drive system constructed in accordance with another embodiment of the present invention.

FIG. 11 illustrates an induction motor drive system 500 constructed in accordance with another embodiment of the invention. System 500 is preferably constructed to include previously described motor 150. System 500 includes line terminals 502 and 504 for connection to a line conductor and a reference or neutral conductor, respectively, of a single-phase AC polar source. System 500 also includes a full wave rectifying voltage doubler circuit 510 consisting of capacitors 512 and 514 and diodes 516 and 518. Capacitors 512 and 514 are connected in series with a neutral terminal node 520 therebetween connected to both line terminal 504 and motor common winding node 156. Diode 516 is connected, with the polarity shown in FIG. 11, between line terminal 502 and a positive output terminal node 522 of circuit 510. Similarly, diode 518 is connected with the polarity shown between line terminal 502 and a negative output terminal node 524 of circuit 510.

With respect to the operation of rectifying circuit 510, during each positive half-cycle of the applied single-phase AC power source, current flows through diode 516 to charge capacitor 512 when the voltage on line terminal 502 is positive relative to the voltage on line terminal 504. During the negative half cycles of the voltage on line terminal 502, current flows through diode 518 to charge capacitor 514. The circuit elements of circuit 510 are preferably selected so that the DC voltages across capacitors 512 and 514 are equal in magnitude, although opposite in polarity. As a result, capacitors 512 and 514 constitute a balanced DC voltage source having positive output terminal node 522, negative output terminal node 524 and neutral terminal node 520. The magnitude of the voltage on either output terminal node 522 or 524 is approximately equal to the RMS single phase voltage on line terminal 502 multiplied by $\sqrt{2}$.

System 500 further includes an inverter circuit 530, consisting of half-bridge inverter legs 532 and 534, for generating a two-phase voltage. Inverter leg 532 consists of power switching devices 536 and 538 connected in series across output nodes 522 and 524 of circuit 510. Inverter leg 534 consists of power switching devices 540 and 542 connected in series across output nodes 522 and 524 and thus in parallel with inverter leg 532. Each of devices 536, 538, 540 and 512 are of the same type described above with respect to devices $S_1$-$S_6$ shown in FIGS. 3 and 4 and each includes an anti-parallel conduction diode as shown in FIG. 11.

System 500 additionally includes a double-pole, double throw switch or relay 550 to enable operation of motor 150 by connection to either the single-phase line source or the output of inverter circuit 530. Switch 550 includes a first pair of terminals a-b, a second pair of terminals c-d and a third pair of terminals e-f. The first pair of terminals a and b of switch 550 are respectively connected to center-tap terminal nodes 552 and 554 of inverter legs 532 and 534. The third pair of terminals e and f of switch 550 are respectively connected to windings 152 and 154 of motor 150. The second pair of terminals c-d are connected to line terminal 502, terminal c being connected directly and a run capacitor 560 being connected between terminal d and line terminal 502.

When switch 550 is in a first position connecting terminals a and b to terminals e and f, respectively, motor 150 is operated in a two-phase mode from the output of inverter circuit 530. When switch 550 is in a second position connecting terminals c and d to terminal e and f, respectively, motor 150 is operated in a single-phase mode from the single phase AC source. During the single-phase mode of operation, run capacitor 560 is connected in series between winding 154 and line terminal 502. Since motor 150 is preferably provided as a conventional PSC motor, capacitor 560 is preferably selected to have the run capacitor characteristics specified by the manufacturer of motor 150, so that motor 150 operates as a conventional PSC motor in the single-phase mode.

In accordance with the present invention, inverter circuit 530 is operated to provide a two-phase pulse width modulated output for application to motor 150 during the two-phase mode of operation. Switching devices 536, 538, 540 and 542 are operated by switch driving signals A+, A−, B+ and B−. Control circuit 300 illustrated in FIG. 6 can be used to generate the necessary driving signals to control the operation of inverter circuit 530. However, it would be necessary to store in EEPROM 320 information corresponding to analog waveforms A and B that have between them a desired phase angle, e.g., 90°, for operation of motor 150 within system 500. That is, since the voltages generated at tap nodes 552 and 554 are directly respectively applied to windings 152 and 154, the phase angle between those voltages must be the desired phase angle for operation of motor 150. It would also be necessary to modify circuit 300 to provide analog waveforms A and B with the different magnitudes which correspond to conventional operation of motor 150, as described above. One way to achieve this is by not tying together the $V_{REF}$ inputs of the above noted model no. AD7528 DAC, applying the voltage scaling signal output by level converter 340 directly to the $V_{REF}$ input corresponding to waveform B and also applying the voltage scaling signal output of level converter 340 through an attenuator to the other $V_{REF}$ input. The attenuator can be provided as, for example, a resistance divider circuit or an operational amplifier circuit with a gain of less than 1.0. If the attenuation is performed to provide a ratio between the voltages applied to the respective $V_{REF}$ inputs that corresponds to the desired ratio between the voltages applied to the motor windings, then DAC 330 will generate waveforms having magnitudes with the same ratio by operation of its multiplying function.

Further, it is noted that if control circuit 300 is used to control the operation of inverter circuit 530, the portions of circuit 300 provided for generating drive signals C+ and C− are not required.

Figure 12:
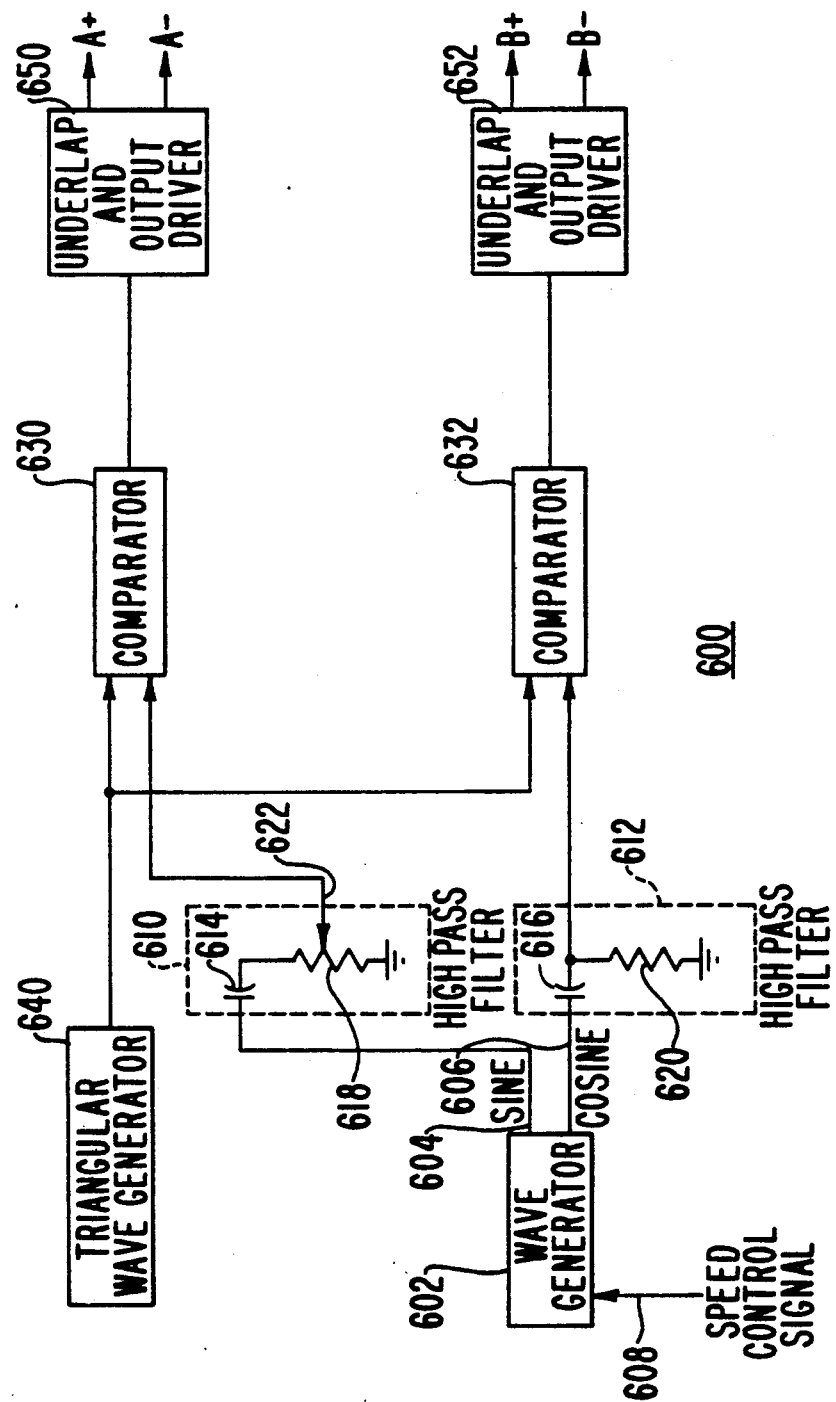
FIG. 12 is a block diagram of a control circuit for use in the system shown in FIG. 11.

FIG. 12 illustrates a preferred control circuit 600 for controlling the operation of inverter circuit 530. Circuit 600 includes a sinusoidal wave generator 602 for generating a sine wave voltage signal on an output 604 and a cosine wave voltage signal on an output 606. Generator 602 includes a speed control input 608 for receiving a motor speed control signal, such as described with respect to circuit 300, for varying the frequency of the generated sine and cosine waves in accordance with a desired motor speed. Generator 602 can be provided as a model no. 4423 signal generator manufactured by Burr-Brown, Inc. of Tucson, Ariz.

In order to maintain a constant volts/hertz ratio for the voltage generated by inverter circuit 530 as the motor speed is varied, the sinusoidal and cosinusoidal voltage signals produced by generator 602 on outputs 604 and 606 are respectively passed through high pass filters 610 and 612. High pass filters 610 and 612 comprise series connected capacitors 614 and 616, and shunt connected resistors 618 and 620. Each high pass filter 610 and 612 has a 6dB/octave roll-off characteristic and a cut-off frequency above the upper limit of the operating frequency range for motor 150. As a result, the sine and cosine wave voltage signals produced by generator 602 are respectively attenuated by high pass filters 610 and 612 in an amount inversely proportional to the frequency of the sine/cosine wave signals. The 6dB/octave roll-off characteristic provides a 1:1 inverse relationship between changes in frequency and voltage. In this way, the amplitude of the sine and cosine wave voltage signals, at the outputs of high pass filters 610 and 612, respectively, vary with and are directly proportional to, frequency changes in generator 602, thereby achieving a constant volts/hertz ratio for each filter output. Exemplary characteristics of capacitors 614 and 616 and resistors 618 and 620, corresponding to the above-noted high pass filter characteristics, are 0.1 $\mu F$ for each of capacitors 614 and 616, and 10K$\Omega$ for each of resistors 618 and 620.

Still referring to FIG. 12, resistor 618 is preferably provided as a potentiometer with an adjusting arm 622. Arm 622, and hence the output of high pass filter 610, is connected to a first input of a comparator circuit 630. The output of high pass filter 612 is connected to a first input of a comparator circuit 632. Circuit 600 further includes a triangular wave generator 640 connected to apply its triangular wave signal output to respective second inputs of both comparators 630 and 632. Generator 640 can be the same as generator 370 described above with respect to FIG. 6. Each comparator 630 and 632 generates on its output either a high or a low logic level voltage according to whether the magnitude of the applied sinusoidal or cosinusoidal signal is greater or less than the magnitude of the applied triangular wave. Thus, the comparison performed by each comparator 630 and 632 and the resulting output is substantially the same as described above with respect to comparators 354, 356 and 360 and illustrated in FIG. 7, i.e., each comparator generates a pulse width modulated control signal.

The outputs of comparators 630 and 632 are respectively applied to underlap and output driver circuits 650 and 652 each of which having substantially the same construction and function as circuits 380, 382 and 384 described above with respect to FIG. 6. As a result, circuit 650 provides switch driving signals A+ and A− for respectively driving switches 536 and 538 (FIG. 11). Similarly, circuit 652 provides switch driving signals B+ and B− for respectively driving switches 540 and 542 (FIG. 11).

Provision of resistor 618 as a potentiometer allows adjustment of a setpoint of filter 610 to enable a reduction of the magnitude of the sine wave voltage signal, generated by generator 602, relative to the cosine wave voltage signal. This in turn results in generation of signals, by comparator 630 and circuit 640, that cause inverter circuit 530 to generate a pulse width modulated voltage, for application to main winding 152, that has a smaller magnitude than the voltage generated for application to winding 154. As a result, the above described feature of the illustrated embodiments whereby $V_{P2} > V_{P1}$ (FIG. 2), is implemented.

In the operation of motor drive system 500, the system is operable in either the two-phase or single-phase mode according to the position of switch 550, as described above. During operation in the two-phase mode, control circuit 600 generates switch driving signals A+, A−, B+ and B− which are applied to respectively drive switches 536, 538, 540 and 542 such that a switch is driven closed when the driving signal applied thereto assumes a positive logic value. As a result of the pulse width modulated closures of the switches, a two-phase pulse width modulated voltage is generated by inverter circuit 530 and applied to windings 152 and 154 of motor 150. As seen in FIG. 11, the voltage generated by each inverter leg 532 and 534 is defined with respect to neutral terminal node 520. Further, in accordance with the manner in which the switch driving signals are generated, the phase angle difference between the voltages applied to the windings of motor 150 is 90°. Additionally, during operation in the two-phase mode, drive system 500 enables variation of the speed of motor 150, in accordance with the speed control signal, while maintaining a constant volts/hertz ratio for each of the voltages generated for application across windings 152 and 154 of motor 150. Considerations for starting motor 150 in the two-phase mode are the same as previously described with respect to inverter circuit 200.

In the single-phase mode, motor 150 can be operated directly from the single-phase AC source as a conventional PSC motor. As a result, motor 150 remains available for operation even when inverter circuit 530 is not available to drive the motor.

While drive system 500 including control circuit 600 has been described as providing a 90° phase angle difference during operation in the two-phase mode, the invention is not so limited. Circuit 600 can be modified to substitute a sinusoidal wave generator for generator 602 that generates two waves that have any desired phase angle difference between them. As described above, the phase angle between the sinusoidal waves generated by generator 602, or a generator substituted therefor, is the phase angle between the voltages applied to the windings of motor 150.

While the relative magnitudes of the voltages generated by inverter circuit 230 (FIG. 3) are controlled by the phase angle between phasors $V_A$ and $V_B$ (FIG. 5), the invention is not so limited. The relative magnitudes of the voltages can also be controlled by storing in EEPROM 320 data for waveforms having different magnitudes that result in the desired relative magnitudes between the voltages generated for application to motor 150. This technique can also be used in the case where control circuit 300 is adapted to generate the switch driving signals for controlling the switching devices of inverter circuit 530 (FIG. 11).

It is additionally noted that the above described modification to circuit 300 to enable its control of inverter circuit 530, in particular the conditioning of the level converter output to provide different voltages for application to the $V_{REF}$ inputs of the DAC circuit, can also be implemented for the control of inverter circuit 230 by either of control circuits 300 (FIG. 6) or 400 (FIG. 9). In such an implementation, the digitally stored waveforms would all have the same magnitude and would have a 90° phase angle difference between the digital waveforms corresponding to waveforms A and B, and between the digital waveforms corresponding to waveforms B and C.

While illustrated embodiments of the invention have been described in which a constant volts/hertz ratio is maintained for each winding of motor 150, the invention is not so limited. With respect to certain motor driven loads, e.g., fans, the magnitude of the load varies with rotational speed. For such loads it may be more efficient to vary the volts/hertz ratio for each motor winding as a predetermined function of rotational speed. With respect to motor drive systems 200 and 500 when operated under control of control circuit 300 (FIG. 6), such variation of the volts/hertz ratio can be accomplished by modifying level converter circuit 340 to generate the scaling signal in accordance with the predetermined function of rotational speed.

While the present invention overcomes the above described problems experienced in the operation of HVAC systems, it will now be apparent to those skilled in the art that the invention can be practiced in other system applications to likewise realize the advantages of the invention.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed:

1. An AC motor drive system for driving an AC motor having a first winding and a second winding, the first winding having first and second ends and a first winding impedance, the second winding having first and second ends and a second winding impedance that is greater than the first impedance, said drive system comprising:
   two-phase power supply means for inverting an inputted DC power supply voltage into a two-phase AC output voltage, said two-phase power supply means having a common terminal, a first phase output terminal, and a second phase output terminal;
   said common terminal for connection to the respective first ends of the first and second windings; and
   said first phase terminal and said second phase terminal for connection to the second ends of said first and second windings, respectively;
   whereby said two-phase power supply means converts the inputted power supply voltage to a two-phase voltage provided on said first, second and common terminals to drive the motor.

2. An AC motor drive system for driving an AC motor having a first winding and a second winding, the first winding having first and second ends and a first winding impedance, the second winding having first and second ends and a second winding impedance that is greater than the first impedance, said drive system comprising:
   two-phase power supply means for converting an inputted power supply voltage into a two-phase AC output voltage, said two-phase power supply means having a common terminal, a first phase output terminal, and a second phase output terminal;
   said common terminal for connection to the respective first ends of the first and second windings; and
   said first phase terminal and said second phase terminal for connection to the second ends of said first and second windings, respectively;
   wherein said two-phase power supply means generates the two-phase AC output voltage having a first phase voltage between said first phase output and common terminals, a second phase voltage between said second phase output and common terminals, and a preselected phase angle relationship between the first and second phase voltages;
   whereby said two-phase power supply means converts the inputted power supply voltage to a two-phase voltage provided on said first, second and common terminals to drive the motor.

3. An AC motor drive system for driving an AC motor having a first winding and a second winding, the first winding having first and second ends and a first winding impedance, the second winding having first and second ends and a second winding impedance that is greater than the first impedance, said drive system comprising:
   two-phase power supply means for converting an inputted power supply voltage into a two-phase AC output voltage, said two-phase power supply means having a common terminal, a first phase output terminal, and a second phase output terminal;
   said common terminal for connection to the respective first ends of the first and second windings; and
   said first phase terminal and said second phase terminal for connection to the second ends of said first and second windings, respectively;
   wherein said two-phase power supply means generates the two-phase AC output voltage having a first phase voltage between said first phase output and common terminals, a second phase voltage between said second phase output and common terminals, a ratio of respective magnitudes of the second phase voltage to the first phase voltage having a preselected value greater than 1;
   whereby said two-phase power supply means converts the inputted power supply voltage to a two-phase voltage provided on said first, second and common terminals to drive the motor.

4. An AC motor drive system for driving an AC motor having a first winding and a second winding, the first winding having first and second ends and a first winding impedance, the second winding having first and second ends and a second winding impedance that is greater than the first impedance, said drive system comprising:
   two-phase power supply means for converting an inputted power supply voltage into a two-phase AC output voltage, said two-phase power supply means having a common terminal, a first phase output terminal, and a second phase output terminal;
   said common terminal for connection to the respective first ends of the first and second windings; and
   said first phase terminal and said second phase terminal for connection to the second ends of said first and second windings, respectively;
   wherein said two-phase power supply means is responsive to an externally applied speed control signal to vary the frequency of the two-phase AC output voltage to thereby vary a rotational speed of the AC motor in accordance with the speed control signal;

whereby said two-phase power supply means converts the inputted power supply voltage to a two-phase voltage provided on said first, second and common terminals to drive the motor.

5. The AC motor drive system of claim 4 wherein said two-phase power supply means generates the two-phase AC output voltage having a first phase voltage between said first phase output and common terminals and a second phase voltage between said second phase output and common terminals; and wherein said two-phase power supply means is further responsive to the speed control signal to vary respective magnitudes of the first and second phase voltages to maintain substantially constant ratios of voltage to frequency for the respective first and second windings of the AC motor.

6. The AC motor drive system of claim 5 wherein said two-phase power supply means maintains a preselected ratio of the respective magnitudes of the second phase voltage to the first phase voltage, the preselected ratio being greater than 1.

7. An AC motor drive system, for connection to a single-phase power supply having a line conductor and a neutral conductor, for driving an AC motor having a first winding and a second winding, the first winding having first and second ends and a first winding impedance, the second winding having first and second ends and a second winding impedance that is greater than the first impedance, said drive system comprising:

two-phase power supply means, including a line terminal for coupling to the line conductor of the single-phase power supply, for rectifying the single-phase power supply and for inverting the rectified single-phase power supply into a two-phase output voltage, said two-phase power supply means having a first phase output terminal and a second phase output terminal;

a neutral terminal for connection to the neutral conductor of the single-phase power supply and for connection to the respective first ends of the first and second windings; and said first and second phase terminals for connection to the second ends of said first and second windings, respectively;

whereby said two-phase power supply means converts power received from the single-phase power supply to a two-phase voltage to drive the motor.

8. An AC motor drive system, for connection to a single-phase power supply having a line conductor and a neutral conductor, for driving an AC motor having a first winding and a second winding, the first winding having first and second ends and a first winding impedance, the second winding having first and second ends and a second winding impedance that is greater than the first impedance, said drive system comprising:

two-phase power supply means, including a line terminal for coupling to the line conductor of the single-phase power supply, for converting the single-phase power supply into a two-phase output voltage, said two-phase power supply means having a first phase output terminal and a second phase output terminal;

a neutral terminal for connection to the neutral conductor of the single-phase power supply and for connection to the respective first ends of the first and second windings; and said first and second phase terminals for connection to the second ends of said first and second windings, respectively;

wherein said two-phase power supply means generates the two-phase AC output voltage having a first phase voltage between said first phase output and neutral terminals, a second phase voltage between said second phase output and neutral terminals, and a preselected phase angle relationship between the first and second phase voltages;

whereby said two-phase power supply means converts power received from the single-phase power supply to a two-phase voltage to drive the motor.

9. An AC motor drive system, for connection to a single-phase power supply having a line conductor and a neutral conductor, for driving an AC motor having a first winding and a second winding, the first winding having first and second ends and a first winding impedance, the second winding having first and second ends and a second winding impedance that is greater than the first impedance, said drive system comprising:

two-phase power supply means, including a line terminal for coupling to the line conductor of the single-phase power supply, for converting the single-phase power supply into a two-phase output voltage, said two-phase power supply means having a first phase output terminal and a second phase output terminal;

a neutral terminal for connection to the neutral conductor of the single-phase power supply and for connection to the respective first ends of the first and second windings; and said first and second phase terminals for connection to the second ends of said first and second windings, respectively;

wherein said two-phase power supply means generates the two-phase AC output voltage having a first phase voltage between said first phase output and neutral terminals, a second phase voltage between said second phase output and neutral terminals, a ratio of respective magnitudes of the second phase voltage to the first phase voltage having a preselected value greater than 1;

whereby said two-phase power supply means converts power received from the single-phase power supply to a two-phase voltage to drive the motor.

10. An AC motor drive system, for connection to a single-phase power supply having a line conductor and a neutral conductor, for driving an AC motor having a first winding and a second winding, the first winding having first and second ends and a first winding impedance, the second winding having first and second ends and a second winding impedance that is greater than the first impedance, said drive system comprising:

two-phase power supply means, including a line terminal for coupling to the line conductor of the single-phase power supply, for converting the single-phase power supply into a two-phase output voltage, said two-phase power supply means having a first phase output terminal and a second phase output terminal;

a neutral terminal for connection to the neutral conductor of the single-phase power supply and for connection to the respective first ends of the first and second windings; and said first and second phase terminals for connection to the second ends of said first and second windings, respectively;

wherein said two-phase power supply means is responsive to an externally applied speed control signal to vary the frequency of the two-phase AC output voltage to thereby vary a rotational speed of the AC motor in accordance with the speed control signal;

whereby said two-phase power supply means converts power received from the single-phase power supply to a two-phase voltage to drive the motor.

11. The AC motor drive system of claim 10 wherein said two-phase power supply means generates the two-phase AC output voltage having a first phase voltage between said first phase output and neutral terminals and a second phase voltage between said second phase output and neutral terminals; and wherein said two-phase power supply means is further responsive to the speed control signal to vary respective magnitudes of the first and second phase voltages to maintain substantially constant ratios of voltage to frequency for the respective first and second windings of the AC motor.

12. The AC motor drive system of claim 11 wherein said two-phase power supply means maintains a preselected ratio of the respective magnitudes of the second phase voltage to the first phase voltage, the preselected ratio being greater than 1.

13. An AC motor drive system, comprising:
two-phase power supply means for inverting an inputted DC power supply voltage into a two-phase AC output voltage, said two-phase power supply means having a common terminal, a first phase output terminal, and a second phase output terminal;

an AC motor having a first winding and a second winding;

said first winding having first and second ends and a first winding impedance;

said second winding having first and second ends and a second wining impedance that is greater than said first impedance;

the respective first ends of said first and second windings being connected to the common terminal of said two-phase power supply means; and the second ends of said first and second windings being respectively connected to said first phase terminal and said second phase terminal of said two-phase power supply means;

whereby said two-phase power supply means converts the inputted power supply voltage to a two-phase voltage provided on said first, second and common terminals to drive said motor.

14. An AC motor drive system, comprising:
two-phase power supply means for converting an inputted power supply voltage into a two-phase AC output voltage, said two-phase power supply means having a common terminal, a first phase output terminal, and a second phase output terminal;

an AC motor having a first winding and a second winding;

said first winding having first and second ends and a first winding impedance;

said second winding having first and second ends and a second winding impedance that is greater than said first impedance;

the respective first ends of said first and second windings being connected to the common terminal of said two-phase power supply means; and the second ends of said first and second windings being respectively connected to said first phase terminal and said second phase terminal of said two-phase power supply means;

wherein said two-phase power supply means comprises a pulse width modulated (PWM) inverter system;

whereby said two-phase power supply means converts the inputted power supply voltage to a two-phase voltage provided on said first, second and common terminals to drive said motor.

15. The AC motor drive system of claim 14, wherein the inputted power supply is an AC power supply;

said drive system including means for rectifying the inputted AC power supply to provide a DC supply voltage; and said pulse width modulated inverter system comprising
a three-phase inverter circuit including input terminals coupled to receive the DC voltage and three output terminals respectively corresponding to said common, first phase and second phase terminals, switching means, included in said three-phase inverter circuit, for inverting the DC voltage into the two-phase output voltage, and voltage control means for generating switching control signals for controlling the operation of said switching means such that a first phase of said two-phase output voltage is generated between said first phase and common terminals and a second phase of said two-phase output voltage is generated between said second phase and common terminals.

16. The AC motor drive system of claim 15, wherein said three-phase inverter circuit includes first, second and third inverter bridge legs connected in parallel;

said switching means comprising a first power switching device and a second power switching device connected in series in each of said first, second and third bridge legs, said three output terminals respectively disposed between the first and second series connected power switching devices of said first, second and third bridge legs.

17. The AC motor drive system of claim 16, wherein said voltage control means comprises:
oscillator means for generating a pulse signal having a pulse signal frequency representative of a desired operating speed of said motor;

means, coupled to said oscillator means, for generating a memory address signal in response to the pulse signal;

memory means, coupled to said address signal generating means, for providing a digital data signal in response to each address signal;

waveform signal generating means, responsive to the digital data signals, for generating a first analog sinusoidal waveform signal and a second analog sinusoidal waveform signal, said first and second sinusoidal waveform signals each having a frequency determined by the pulse signal frequency;

means for inverting the first sinusoidal waveform signal to generate a third sinusoidal waveform signal;

means for generating a fixed frequency comparison signal;

comparator means, coupled to receive the fixed frequency comparison signal and the respective first, second and third sinusoidal waveform signals, for providing first second, and third sinusoidally weighted pulse width modulated PWM) switching signals; and output means for providing said first, second and third PWM signals and respective logical complements thereof as said switching control signals and for applying said first, second and third PWM signals and their logical complements to control the operation of said first and second power switching devices of said first, second and third inverter legs, respectively.

18. The AC motor drive system of claim 17, wherein said voltage control means is responsive to an externally generated speed control signal, representative of the desired motor operating speed, to control the operating speed of said motor;

said oscillator means generating the pulse signal with the pulse signal frequency determined by the speed control signal; and said waveform signal generating means generating the first and second analog sinusoidal waveform signals each with an amplitude determined by the speed control signal such that each phase of said two-phase output voltage has a substantially constant predetermined volts/hertz ratio.

19. The AC motor drive system of claim 18, wherein said waveform signal generating means is a multiplying dual digital-to-analog converter; and wherein said comparison signal generating means is a triangular wave generator.

20. The AC motor drive system of claim 16, wherein said voltage control means comprises:

oscillator means for generating a pulse signal having a pulse signal frequency representative of a desired operating speed of said motor;

means, coupled to the oscillator means, for generating an address signal in response to the pulse signal;

memory means, coupled to said address generating means, for generating a digital data signal in response to each address signal;

waveform signal generating means, responsive to the digital data signals, for generating a first, a second and a third sinusoidal waveform signal, the first, second and third sinusoidal waveform signals each having a frequency determined by the pulse signal frequency;

means for generating a fixed frequency comparison signal;

comparator means, coupled to receive the fixed frequency comparison signal and the respective first, second and third sinusoidal waveform signals, for providing first, second, and third sinusoidally weighted pulse width modulated (PWM) switching signals; and output means for providing said first, second and third PWM signals and respective logical complements thereof as said switching control signals and for applying said first, second and third PWM signals and their logical complements to control the operation of said first and second power switching devices of said first, second and third inverter legs, respectively;

21. The AC motor drive system of claim 20, wherein said voltage control means is responsive to an externally generated speed control signal, representative of the desired motor operating speed, to control the operating speed of said motor;

said oscillator means generating the pulse signal with the pulse signal frequency determined by the speed control signal; and said waveform signal generating means generating the first, second and third analog sinusoidal waveform signals each with an amplitude determined by the speed control signal such that said two-phase output voltage has a substantially constant predetermined volts/hertz ratio.

22. The AC motor drive system of claim 21, wherein said waveform signal generating means is a multiplying digital-to-analog converter; and wherein said comparison signal generating means is a triangular wave generator.

23. The AC motor drive system of claim 17 or 20, wherein said output means further includes underlap means for providing said first, second and third PWM signals and their respective logical complements such that each PWM signal and its logical complement cannot cause the first and second power switching devices to which they are respectively applied to turn on at the same time.

24. An AC motor drive system for connection to a single-phase AC power supply having a line conductor and a neutral conductor, said drive system comprising:

two-phase power supply means, including a line terminal for coupling to the line conductor of the single-phase power supply, for rectifying the single-phase power supply and for inverting the rectified single-phase power supply into a two-phase output voltage, said two-phase power supply means having a first phase output terminal and a second phase output terminal;

a neutral terminal for connection to the neutral conductor of the single-phase power supply;

an AC motor having a first winding and a second winding;

said first winding having first and second ends and a first winding impedance;

said second winding having first and second ends and a second winding impedance that is greater than said first impedance;

the respective first ends of said first and second windings being connected to said neutral terminal; and the second ends of said first and second windings being respectively coupled to said first and second phase terminals of said two-phase power supply means.

25. An AC motor drive system, for connection to a single-phase AC power supply having a line conductor and a neutral conductor, said drive system comprising:

two-phase power supply means, including a line terminal for coupling to the line conductor of the single-phase power supply, for converting the single-phase power supply into a two-phase output voltage, said two-phase power supply means having a first phase output terminal and a second phase output terminal, said two-phase power supply means including means for rectifying the single-phase power supply to provide a DC supply voltage on positive and negative polarity terminals, and pulse width modulated inverter means, coupled to the positive and negative polarity terminals, for inverting the DC supply voltage to provide the two-phase output voltage;

a neutral terminal for connection to the neutral conductor of the single-phase power supply;

an AC motor having a first winding and a second winding;

said first winding having first and second ends and a first winding impedance;

said second winding having first and second ends and a second winding impedance that is greater than said first impedance;

the respective first ends of said first and second windings being connected to said neutral terminal; and the second ends of said first and second windings being respectively coupled to said first and second phase terminals of said two-phase power supply means.

26. The AC motor drive system of claim 25, said pulse width modulated inverter means including:

a first half bridge circuit including
   a first power switching device and a second power switching device coupled in series between the positive and negative polarity terminals, and
   a first tap node between the series connected first and second power switching devices, said first tap node being coupled to said first phase output terminal;

a second half bridge circuit including
   a third power switching device and a fourth power switching device coupled in series between the positive and negative polarity terminals, and
   a second tap node between the series connected third and fourth power switching devices, said second tap node being connected to the second phase terminal; and voltage control means for generating switching control signals for controlling the operation of said first, second, third and fourth power switching devices to provide the two-phase output voltage on said first and second phase terminals.

27. The AC motor drive system of claim 26, wherein the voltage control means includes:

means for generating a fixed frequency comparison signal;

waveform signal generating means for generating a first sinusoidal waveform signal and a second sinusoidal waveform signal to have a predetermined phase angle difference therebetween and a common frequency that corresponds to a desired operating speed of said motor;

first comparator means, coupled to receive said first sinusoidal waveform signal and the fixed frequency signal, for providing a first sinusoidally weighted pulse width modulated (PWM) switching signal;

second comparator means, coupled to receive the second sinusoidal waveform signal and the fixed frequency signal, for providing a second sinusoidally weighted pulse width modulated (PWM) switching signal; and output means for providing said first and second PWM signals and respective logical complements thereof as said switching control signals, for applying said first PWM signal and its logical complement to respectively control said first and second power switching devices of said first half bridge, and for applying said second PWM signal and its logical complement to respectively control said third and fourth power switching devices of said second half bridge.

28. The AC motor drive system of claim 27, wherein said voltage control means is responsive to an externally generated speed control signal, representative of the desired motor operating speed, to control the operating speed of said motor;

said waveform signal generating means generating said first and second sinusoidal waveform signals with the common frequency determined by the speed control signal;

said voltage control means further comprising:

first filter means, coupled between said waveform signal generating means and said first comparator means, for varying an amplitude of the first sinusoidal waveform signal in accordance with the common frequency thereof in a manner effective to maintain a substantially constant ratio between the amplitude and the common frequency of the first sinusoidal waveform signal applied to said first comparator means; and second filter means, coupled between said waveform signal generating means and said second comparator means, for varying an amplitude of the second sinusoidal waveform signal in accordance with the common frequency thereof in a manner effective to maintain a substantially constant ratio between the amplitude and the common frequency of the second sinusoidal waveform signal applied to said second comparator means.

29. The AC motor drive system of claim 28 wherein said first filter means includes means for adjusting a filter setpoint so that by adjusting the filter set point the amplitude of the first sinusoidal waveform signal can be attenuated by a greater amount than an amount by which said second filter means attenuates the second sinusoidal waveform signal.

30. The AC motor drive system of claim 28 wherein the predetermined phase angle between the first and second sinusoidal waveform signals is 90°.

31. The AC motor drive system of claim 28 wherein each said first and second filter means is a high pass filter including a series connected capacitor and a shunt connected resistor.

32. The AC motor drive system of claim 27 wherein said comparison signal generating means is a triangular wave generator.

33. The AC motor drive system of claims 24, 25, 26 or 27, wherein said motor is a permanent split capacitor type motor, said first winding is a main winding and said second winding is a start winding;

said drive system including a double-pole, double-throw (DPDT) switch having first and second switch terminals respectively coupled to the second ends of said main and start windings, third and fourth switch terminals respectively coupled to said first and second phase terminals, and fifth and sixth switch terminals;

said fifth switch terminal coupled to said line terminal; and a run capacitor coupled between said sixth switch terminal and said line terminal;

so that said DPDT switch can be operated to connect said motor to operate from either the single-phase power supply or the two-phase power supply means.

34. An AC motor drive system, comprising:

two-phase power supply means for converting an inputted single-phase AC voltage of a single-phase AC power supply into a two-phase AC output voltage, said two-phase power supply means having a common terminal, a first phase output terminal, and a second phase output terminal;

a line terminal and a neutral terminal for coupling to the single-phase AC power supply;

a permanent split capacitor type induction motor having a main winding and a start winding;

said main winding having first and second ends and a main winding impedance;

said start winding having first and second ends and a start winding impedance that is greater than said main winding impedance;

a three-pole, double-throw (TPDT) switch having first, second and third terminals respectively coupled to the second end of said start winding, the first ends of said main and start windings, and the second end of said main winding, said TPDT switch having fourth, fifth and sixth terminals respectively coupled to said first phase output, common and second phase output terminals, eighth and ninth terminals of said TPDT switch respectively coupled to said line and neutral input terminals;

a seventh terminal of said TPDT switch;

a run capacitor coupled between said seventh terminal and said line input terminal; and said TPDT switch connecting said first, second and third terminals to said fourth, fifth and sixth terminals, respectively, in a two-phase operating mode; and said TPDT switch connecting said first, second and third terminals to said seventh, eighth and ninth terminals, respectively, in a single-phase operating mode;

whereby said two-phase power supply means converts the inputted single-phase voltage to a two-phase voltage provided on said first phase output, second phase output and common terminals and said TPDT switch can be operated to connect said motor to operate from either the single-phase supply or the two phase power supply means.

* * * * *